(12) United States Patent
Sarkis et al.

(10) Patent No.: US 12,335,900 B2
(45) Date of Patent: Jun. 17, 2025

(54) IDENTIFICATION OF SIDELINK POSITIONING REFERENCE SIGNALS

(71) Applicant: QUALCOMM Incorporated, San Diego, CA (US)

(72) Inventors: Gabi Sarkis, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/874,151

(22) Filed: Jul. 26, 2022

(65) Prior Publication Data

US 2024/0040533 A1    Feb. 1, 2024

(51) Int. Cl.
*H04W 64/00* (2009.01)
*H04L 5/00* (2006.01)

(52) U.S. Cl.
CPC .......... *H04W 64/00* (2013.01); *H04L 5/0051* (2013.01)

(58) Field of Classification Search
CPC . H04W 64/00; H04W 64/003; H04W 64/006; H04L 5/0051; H04L 5/005; H04L 5/0048; H04L 5/003; H04L 5/00
See application file for complete search history.

(56) References Cited

FOREIGN PATENT DOCUMENTS

| WO | 2021090248 A1 | 5/2021 |
|---|---|---|
| WO | 2021240478 A1 | 12/2021 |
| WO | 2022195487 A1 | 9/2022 |
| WO | 2022241354 | 11/2022 |
| WO | 2023278917 | 1/2023 |

OTHER PUBLICATIONS

Harounabadi M., et al., "V2X in 3GPP Standardization: NR Sidelink in Rel-16 and Beyond", IEEE Communication Standards Magazine, arXiv:2104.11135v1 [cs.NI] Apr. 22, 2021, pp. 1-10.
International Search Report and Written Opinion—PCT/US2023/023191—ISA/EPO—Sep. 14, 2023.

*Primary Examiner* — Diana J. Cheng
(74) *Attorney, Agent, or Firm* — Thien T. Nguyen

(57) ABSTRACT

Sidelink (SL) positioning of user equipments (UEs) is supported by providing with SL positioning reference signals (PRS) an indication of the identity of the SL positioning session and the SL PRS source identifier. A UE may transmit a payload-based indication or a sequence-based indication of the identity of the SL positioning session and the source identifier. The pay-load based indication is included in, e.g., a Layer 1 (L1) and/or Layer 2 (L2) control message associated with the SL PRS. The sequence-based indication may be generated using the indication of the identity of the SL positioning session and the source identifier to initialize or seed the generation of the PRS sequence, scramble the PRS sequence, or generate a cover code that is applied to the PRS sequence.

40 Claims, 8 Drawing Sheets

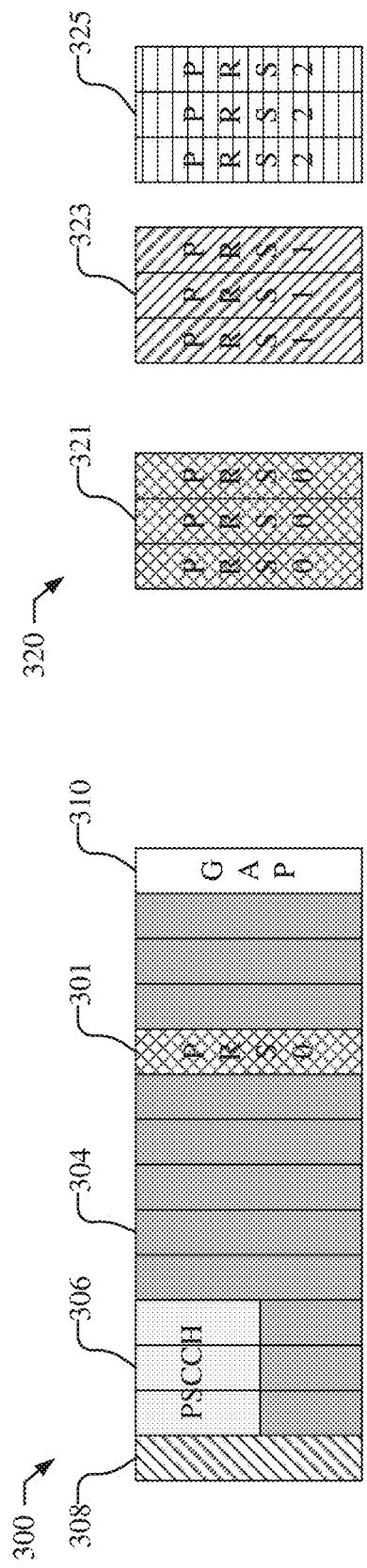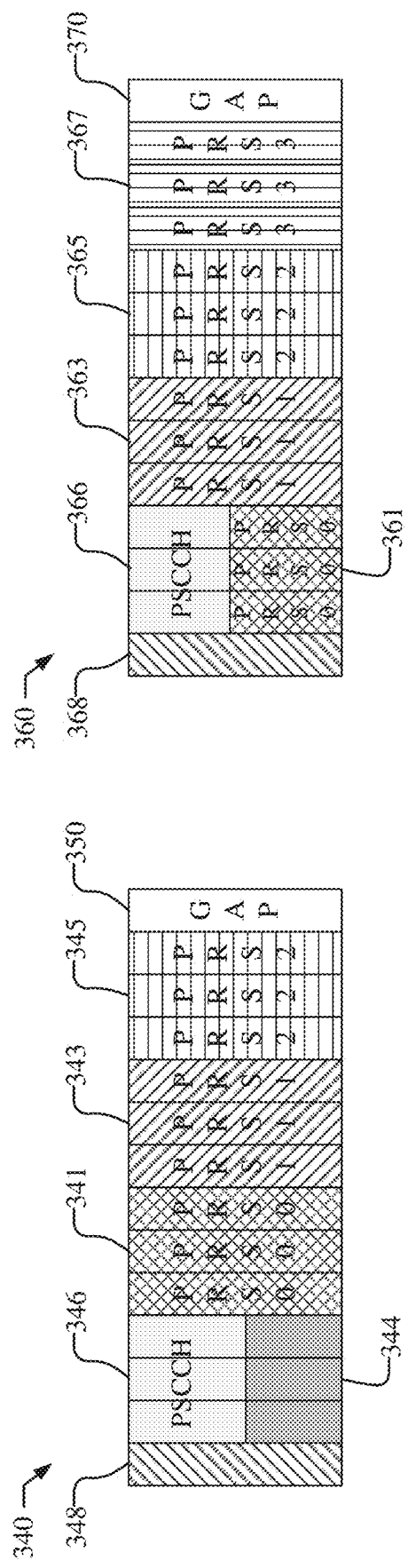
Fig. 3A
Fig. 3B
Fig. 3C
Fig. 3D

IDENTIFICATION OF SIDELINK POSITIONING REFERENCE SIGNALS

BACKGROUND

Field

The subject matter disclosed herein relates to wireless communications systems, and more particularly to systems, methods, and devices that support positioning.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit). Additionally, UEs may communicate directly with each other using sidelink channels.

The location of UE may be useful or essential to a number of applications including emergency calls, navigation, direction finding, asset tracking and Internet service. The location of a UE may be estimated based on information gathered from various systems. In a cellular network implemented according to LTE or 5G NR, for example, a base station may send downlink reference signals with which positioning measurements are performed by a UE and/or the UE may send uplink reference signals with which positioning measurements are performed by the base stations. The UE may compute an estimate of its own location using the positioning measurements in UE-based positioning or may send the positioning measurements to a network entity, e.g., location server, which may compute the UE location based on the positioning measurements in UE-assisted positioning. Support for sidelink positioning is desirable.

SUMMARY

Sidelink (SL) positioning of user equipments (UEs) is supported by providing with SL positioning reference signals (PRS) an indication of the identity of the SL positioning session and the SL PRS source identifier. A UE may transmit a payload-based indication or a sequence-based indication of the identity of the SL positioning session and the source identifier. The pay-load based indication is included in, e.g., a Layer 1 (L1) and/or Layer 2 (L2) control message associated with the SL PRS. The sequence-based indication may be generated using the indication of the identity of the SL positioning session and the source identifier to initialize or seed the generation of the PRS sequence, scramble the PRS sequence, or generate a cover code that is applied to the PRS sequence.

In one implementation, a method for supporting sidelink (SL) positioning performed by a user equipment (UE), includes transmitting in a message associated with a SL positioning reference signal (PRS), the message comprising identification of the UE as a source of transmission of the SL PRS and an indication of a SL positioning session identifier; and transmitting the SL PRS associated with the message.

In one implementation, a user equipment (UE) configured for supporting sidelink (SL) positioning, includes a wireless transceiver configured to wirelessly communicate with network entities; at least one memory; and at least one processor coupled to the wireless transceiver and the at least one memory, the at least one processor configured to: transmit in a message associated with a SL positioning reference signal (PRS), the message comprising identification of the UE as a source of transmission of the SL PRS and an indication of a SL positioning session identifier; and transmit the SL PRS associated with the message.

In one implementation, a user equipment (UE) configured for supporting sidelink (SL) positioning, includes means for transmitting in a message associated with a SL positioning reference signal (PRS), the message comprising identification of the UE as a source of transmission of the SL PRS and an indication of a SL positioning session identifier; and means for transmitting the SL PRS associated with the message.

In one implementation, a non-transitory storage medium including program code stored thereon, the program code is operable to configure at least one processor in a user equipment (UE) for supporting sidelink (SL) positioning, the program code comprising instructions to: transmit in a message associated with a SL positioning reference signal (PRS), the message comprising identification of the UE as a source of transmission of the SL PRS and an indication of a SL positioning session identifier; and transmit the SL PRS associated with the message.

In one implementation, a method for supporting sidelink (SL) positioning performed by a user equipment (UE), includes obtaining SL positioning session information comprising an indication of a SL positioning session identifier; generating SL positioning reference signal (PRS) based on the indication of the SL positioning session identifier and identification of the UE; and transmitting the SL PRS.

In one implementation, a user equipment (UE) configured for supporting sidelink (SL) positioning, includes a wireless transceiver configured to wirelessly communicate with network entities; at least one memory; and at least one processor coupled to the wireless transceiver and the at least one memory, the at least one processor configured to: obtain SL positioning session information comprising an indication of a SL positioning session identifier; generate SL positioning reference signal (PRS) based on the indication of the SL positioning session identifier and identification of the UE; and transmit the SL PRS.

In one implementation, a user equipment (UE) configured for supporting sidelink (SL) positioning, includes means for obtaining SL positioning session information comprising an indication of a SL positioning session identifier; means for generating SL positioning reference signal (PRS) based on the indication of the SL positioning session identifier and identification of the UE; and means for transmitting the SL PRS.

In one implementation, a non-transitory storage medium including program code stored thereon, the program code is operable to configure at least one processor in a user equipment (UE) for supporting sidelink (SL) positioning, the program code comprising instructions to: obtain SL positioning session information comprising an indication of a SL positioning session identifier; generate SL positioning reference signal (PRS) based on the indication of the SL positioning session identifier and identification of the UE; and transmit the SL PRS.

BRIEF DESCRIPTION OF THE DRAWINGS

FIGS. 3A-3D each illustrate slot based sidelink transmissions, with multiple sidelink symbols, and illustrate various options for the structure of sidelink positioning signal transmissions.

Figure 1:
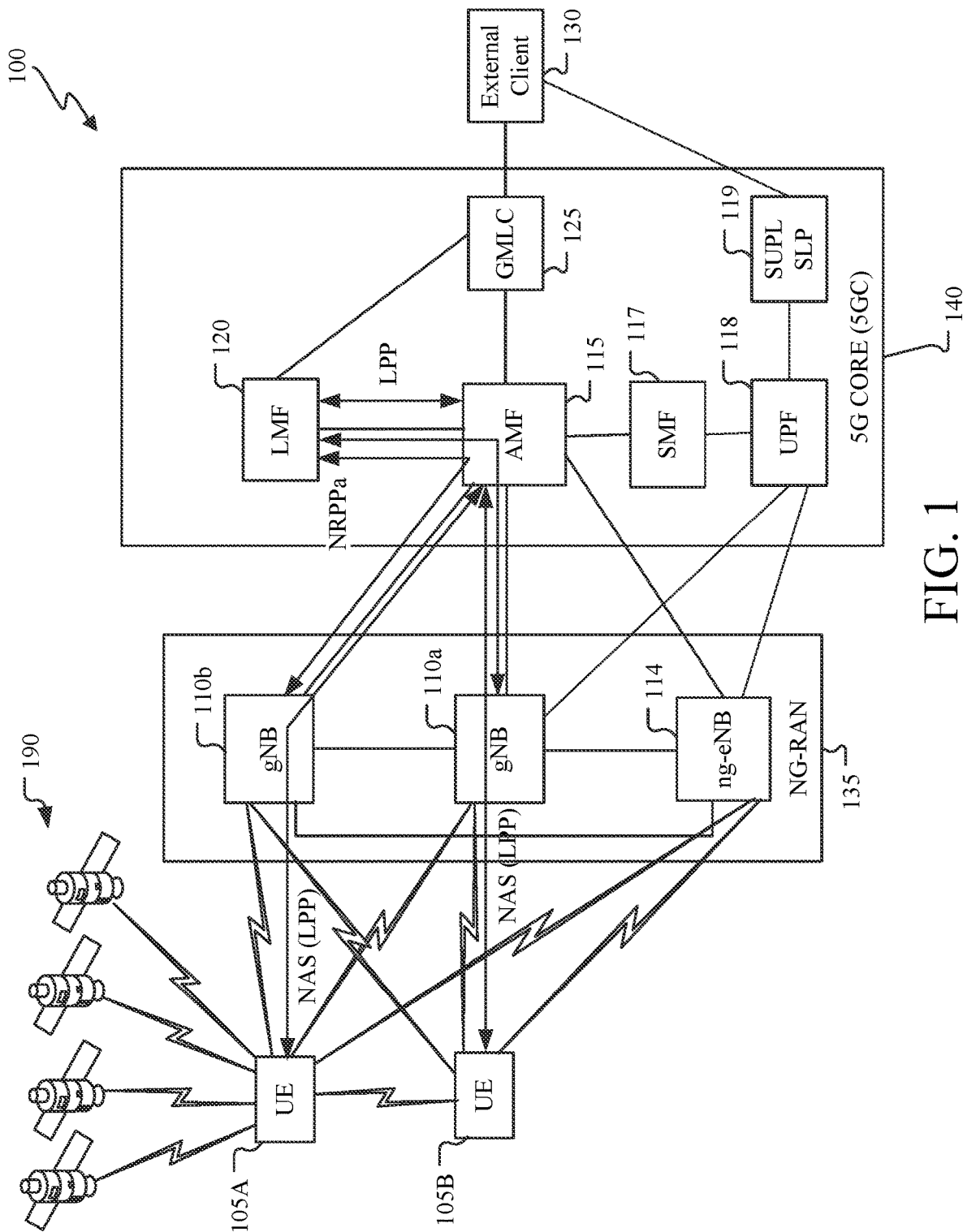
FIG. 1 shows an architecture of communication system including a number of UEs, a Radio Access Network (RAN), and a 5G Core Network (5GC).

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, Industrial IoT (IIoT), etc.) used to communicate over a wireless communications network. A UE may be mobile or may (e.g., at certain times) be stationary, and may communicate with a Radio Access Network (RAN). For example, as used herein, a UE may be an infrastructure node, such as a roadside unit (RSU), Positioning Reference Unit (PRU), etc. As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," RSU, PRU, or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a sidelink channel. As used herein the term traffic channel (TCH) can refer to either an uplink/reverse or downlink/forward or sidelink traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Standardization of cellular systems, such as the Fifth Generation (5G) or New Radio (NR) network system, is ongoing in the 3rd Generation Partnership Project (3GPP). The 3GPP Release 16 and Release 17, for example, have introduced standardization and support of several techniques enabling and enhancing positioning in cellular systems. By way of example, RAT-dependent positioning systems that have been undergoing standardization include Enhanced Cell ID (E-CID) (using Received Signal Strength (RSS) and Round Trip Time (RTT) and optionally using Angle of Arrival (AoA)), downlink (DL) positioning, such as Observed Time Difference of Arrival (OTDOA), uplink (UL) positioning, such as Uplink Time Difference of Arrival (UTDOA). RAT-independent positioning systems that have been undergoing standardization include Enhanced Global Navigation Satellite System (GNSS), and other technologies such as Wireless Local Area Network (WLAN), Bluetooth®, Terrestrial Beason System (TBS), and sensor based positioning including barometric sensor and motion sensor. Additionally, Hybrid positioning has undergone standardization, which includes the use of multiple methods for positioning, e.g., A-GNSS+OTDOA hybrid positioning.

Standardization of sidelink (SL) positioning may be undertaken in the future, e.g., in 3GPP Release 18. SL positioning, for example, may use reference signals, such as positioning reference signals (PRS) transmitted and received by UEs over sidelink channels, which may be measured to determine ranges between UEs, angle of arrival of signals, relative positions of UEs etc., which, based on known positions of one or more UEs, may be used to further determine an absolute position of UEs, if desired.

FIG. 1 shows an example of a communication system 100 that includes a first UE 105A, a second UE 105B, a Radio Access Network (RAN) 135, here a Fifth Generation (5G) Next Generation (NG) RAN (NG-RAN), and a 5G Core Network (5GC) 140. The 5GC 140, for example, may be a public land mobile network (PLMN). The UE 105A and UE 105B may be sometimes referred to herein as UE 105 individually or UEs 105 collectively. The UE 105 may be, e.g., an IoT device, a location tracker device, a cellular telephone, a vehicle, an On-Board Unit (OBU), or other similar type of device. The UE 105 may additionally be considered an RSU or PRU. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the $3^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 105B may be configured and coupled similarly to the UE 105A to send and/or receive signals to/from similar other entities in the system 100. The communication system 100 may utilize information from a constellation of satellite vehicles (SVs) 190 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125, a User Plane Function (UPF) 118, and a Secure User Plane Location (SUPL) Location Platform (SUPL SLP) 119. The gNBs 110a, 110b and the ng-eNB 114 are communicatively coupled to each other, are each configured wirelessly communicate to bi-directionally with the UEs 105, and are each communicatively coupled to, and configured to bi-directionally communicate with, the AMF 115 and the UPF 118. The gNBs 110a, 110b, and the ng-eNB 114 may be referred to as base stations (BSs). The AMF 115, the SMF 117, the LMF 120, and the GMLC 125 are communicatively coupled to each other, and the GMLC 125 is communicatively coupled to an external client 130. The AMF 115, the SMF 117, the UPF 118, and the SUPL SLP 119 are communicatively coupled to each other, and the SUPL SLP 119 is communicatively coupled to the external client 130. The SMF 117 may further serve as an initial contact point of a Service Control Function (SCF) (not shown) to create, control, and delete media sessions. The base stations 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth, Bluetooth-low energy (BLE), Zigbee, etc. One or more of the base stations 110a, 110b, 114 may be configured to communicate with the UEs 105 via multiple carriers. Each of the base stations 110a, 110b, 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted, as necessary. Specifically, although only UEs 105 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UEs 105) or at base stations 110a, 110b, 114 and/or provide location assistance to the UEs 105 (via the LMF 120 or SUPL SLP 119 or other location server) and/or compute a location for one or both of the UEs 105 at a location-capable device such as the UEs 105, the base stations 110a, 110b, the LMF 120, or SUPL SLP 119 based on measurement quantities received at the UEs 105 or the base stations 110a, 110b, 114 for such directionally-transmitted signals. The GMLC 125, the LMF 120, the AMF 115, the SMF 117, the UPF 118, the SUPL SLP 119, the ng-eNB (eNodeB) 114 and the gNBs (gNodeBs) 110a, 110b are examples and may, in various embodiments, be replaced by or include various other entities, including location server functionality and/or base station functionality.

The system 100 is capable of wireless communication in that components of the system 100 can communicate with one another (at least sometimes using wireless connections) directly or indirectly, e.g., via the base stations 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UEs 105 may include multiple UEs and may be a mobile wireless communication device but may communicate wirelessly and via wired connections. The UEs 105 may be any of a variety of devices, e.g., a smartphone, a tablet computer, a vehicle-based device, etc., but these are examples only as the UEs 105 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UEs 105, the base stations 110a, 110b, 114, the core network 140, and/or the external client 130. For example, such other devices may include IoT or IIoT devices, medical devices, home entertainment and/or automation devices, etc. The core network 140 may communicate with the external client 130 (e.g., a computer system), e.g., to allow the external client 130 to request and/or receive location information regarding the UEs 105 (e.g., via the GMLC 125 or SUPL SLP 119).

The UEs 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105 may communicate with each other through UE-to-UE sidelink (SL) communications by transmitting over one or more sidelink channels, such as a physical sidelink shared channel (PSSCH), a physical sidelink broadcast channel (PSBCH), a physical sidelink control channel (PSCCH), Synchronization Signal Block (SSB), sidelink channel state information reference signal (SL-CSIRS), physical sidelink feedback channel (PSFCH), or sidelink sounding reference signals (SL-SRS).

The UEs 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UEs 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UEs 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth (BT), Worldwide Interoperability for Microwave Access (WiMAX), 5G new radio (NR) (e.g., using the NG-RAN 135 and the 5GC 140), etc. The UEs 105 may support wireless communication using a Wireless Local Area Network (WLAN) which may connect to other networks (e.g., the Internet) using a Digital Subscriber Line (DSL) or packet cable, for example. The use of one or more of these RATs may allow the UEs 105 to communicate with the external client 130 (e.g., via elements of the 5GC 140 not shown in FIG. 1, or possibly via the GMLC 125) and/or allow the external client 130 to receive location information regarding the UEs 105 (e.g., via the GMLC 125 or SUPL SLP 119).

Each of the UEs 105 may include a single entity or may include multiple entities such as in a personal area network where a user may employ audio, video and/or data I/O (input/output) devices and/or body sensors and a separate wireline or wireless modem. An estimate of a location of a UE, e.g., UE 105, may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of the UE may be expressed as a civic location (e.g., as a postal address or the designation of some point or small area in a building such as a particular room or floor). A location of the UE may be expressed as an area or volume (defined either geographically or in civic form) within which the UE is expected to be located with some probability or confidence level (e.g., 67%, 95%, etc.). A location of the UE may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UEs 105 may be configured to communicate with other entities using one or more of a variety of technologies. The UEs 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UEs 105 via wireless communication between the UEs and one or more of the gNBs 110a, 110b, which may provide wireless communications access to the 5GC 140 on behalf of the UE using 5G. In FIG. 1, the serving gNB for the UE 105A is assumed to be the gNB 110b, while the serving gNB for the UE 105B is assumed to be the gNB 110a, although another gNB may act as a serving gNB if the UEs 105 move to another location or may act as a secondary gNB to provide additional throughput and bandwidth to the UEs 105 and the UEs 105 may share the same serving gNB.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UEs 105. One or more of the gNBs 110a, 110b and/or the ng-eNB 114 may be configured to function as positioning-only beacons which may transmit signals to assist with determining the position of the UEs 105 but may not receive signals from the UEs 105 or from other UEs.

The base stations 110a, 110b, 114 may each comprise one or more TRPs. For example, each sector within a cell of a base station may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Communications system 100 may support NR and support communications between the one or more base stations 110a, 110b, 114 and supported UEs 105. The UEs may be dispersed throughout the wireless communications system 100, and each UE may be stationary or mobile. As part of the communication, each of the base stations 110a, 110b, 114 and UEs 105 may support reference signal transmission for operations, including channel estimation, beam management and scheduling, and wireless device positioning within the coverage areas of one or more base stations.

For example, the base stations 110a, 110b, 114 may transmit one or more downlink reference signals for NR communications, including channel state information reference signal (CSI-RS) transmission. Each of the CSI-RS transmissions may be configured for a specific UE 105 to estimate the channel and report channel quality information. The reported channel quality information may be used for scheduling or link adaptation at the base stations 110a, 110b, 114 or as part of a mobility or beam management procedure for directional transmission associated with the enhanced channel resources. Similarly, the UEs 105 may be configured to transmit uplink signals to one or more base stations 110a, 110b, 114 and sidelink transmissions between UEs 105.

The base stations 110a, 110b, 114 may transmit one or more additional downlink reference signals, including a positioning reference signal (PRS) transmission. The PRS transmission may be configured for a specific UEs 105 to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105 (such as global positioning system (GPS) technology).

A base station 110a, 110b, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110a, 110b, 114. The structure of the one or more PRS resources, PRS resource sets, and PRS resource settings within a PRS transmission may be referred to as a multi-level resource setting. For example, multi-level PRS resource setting of the base station 110a, 110b, 114 may include multiple PRS resource sets and each PRS resource set may contain a set of PRS resources (such as a set of 4 PRS resources).

The UEs 105 may receive the PRS transmission over the one or more PRS resources of the slot. The UEs 105 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UEs 105 may be configured to transmit one or more additional uplink reference signals that may be received by base stations 110a, 110b, 114 and used for positioning. For example, UEs 105 may transmit sounding reference signal (SRS) for positioning. Base stations 110a, 110b, 114 that receive uplink reference signals from a UEs 105 may perform positioning measurements, such as one or more of a time of arrival (TOA), reception to transmission difference (UE Rx-Tx).

Aspects of wireless communications system 100 may include use of downlink PRS transmissions by the base station 110a, 110b, 114 or uplink SRS transmissions by a UE, e.g., UE 105A or UE 105B, for UE location determination. For downlink-based UE location determination, a location server, e.g., LMF 120 in a NR network, or E-SMLC in LTE (sometimes referred to as location server 120), may be used to provide positioning assistance, such as PRS assistance data (AD) to the UE. For uplink-based UE location determination, a location server 120 and/or a serving base station, e.g., gNB 110a, may be used to provide positioning assistance, such as SRS assistance data, to receiving entities, such as base stations (e.g., gNBs 110a, 110b, and the other UE(s)). The SRS assistance data, for example, may include the SRS transmission occasion and other parameters, e.g., such as the reference signal pattern, power if different from nominal, the number of repetitions, etc.

A position estimation of the UE may be determined using reference signals, such as PRS signals or SRS for positioning signals, or other reference signals, from one or more base stations 110a, 110b, 114 or the UE. Positioning methods, such as Time Difference of Arrival (TDOA), DL Time Difference of Arrival (DL-TDOA), DL Angle of Departure (DL AoD), Enhanced Cell ID (ECID) are position methods that may be used to estimate the position of the UE using reference signals from base stations. TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g., as defined in 3GPP TS 36.211.

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AoA), UL Relative Time of Arrival (UL-RTOA) and downlink and uplink based positioning methods, e.g., Round-trip time (RTT) with one or more neighboring base stations. Additionally, sidelink based positioning may be used in which UEs transmit and/or receive sidelink positioning reference signals that are measured and used for positioning.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UEs 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UEs 105, including cell change and handover and may participate in supporting a signaling connection to the UEs 105 and possibly data and voice bearers for the UEs 105. The LMF 120 may communicate directly or indirectly with the UEs 105, e.g., through wireless communications, or directly or indirectly with the base stations 110a, 110b, 114. The LMF 120 may support positioning of the UEs 105 when the UEs 105 accesses the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UEs 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SUPL SLP). At least part of the positioning functionality (including derivation of the location of the UE) may be performed at the UE (e.g., using signal measurements obtained by the UE for signals transmitted by wireless nodes such as the gNBs 110a, 110b and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110a, 110b and/or the ng-eNB 114. The AMF 115 may serve as a control node that processes signaling between the UEs 105 and the core network 140, and provides QoS (Quality of Service) flow and session management. The AMF 115 may support mobility of the UEs 105 including cell change and handover and may participate in supporting signaling connection to the UEs 105.

The GMLC 125 may support a location request for the UEs 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UEs 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

A User Plane Function (UPF) 118 may support voice and data bearers for UE 105 and may enable UE 105 voice and data access to other networks such as the Internet. The UPF 118 may be connected to gNBs 110 and ng-eNB 114. UPF 118 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 118 may be connected to the SUPL SLP 119 to enable support of positioning of UE 105 using SUPL. SUPL SLP 119 may be further connected to or accessible from external client 130.

As illustrated, a Session Management Function (SMF) 117 connects to the AMF 115 and the UPF 118. The SMF 117 may have the capability to control both a local and a central UPF within a PDU session. SMF 117 may manage the establishment, modification, and release of PDU sessions for UE 105, perform IP address allocation and management for UE 105, act as a Dynamic Host Configuration Protocol (DHCP) server for UE 105, and select and control a UPF 118 on behalf of UE 105.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UEs 105 may communicate using an LTE Positioning Protocol (LPP), which may be defined in 3GPP TS 36.355. Here, LPP messages may be transferred between the UEs 105 and the LMF 120 via the AMF 115 and the serving gNB 110*a*, 110*b* or the serving ng-eNB 114 for the UEs 105. For example, LPP messages may be transferred between the LMF 120 and the AMF 115 using a 5G Location Services Application Protocol (LCS AP) and may be transferred between the AMF 115 and the UEs 105 using a 5G Non-Access Stratum (NAS) protocol. Communication between the LMF 120 and UEs 105 using LPP protocol, may sometimes referred to herein as direct communication, as the messages are transparent to the serving gNB, i.e., the serving gNB does not need to understand the content of the message, but simply forwards the communication between the LMF 120 and UEs 105. In contrast, during communications using NPP protocol, such as NRPPa, the serving gNB unpacks the message, picks out the content, which is packed and sent to UE, e.g., in a Uu air interface via Radio Resource Control (RRC), Medium Access Control-Control Element (MAC-CE), Downlink Control Information (DCI), etc. The LPP protocol may be used to support positioning of the UEs 105 using UE-assisted and/or UE-based position methods such as A-GNSS, RTK, TDOA, AOA, AOD, and/or E-CID. The NRPPa protocol may be used to support positioning of the UEs 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional Synchronization Signal (SS) transmissions from the gNBs 110*a*, 110*b*, and/or the ng-eNB 114. The LMF 120 is illustrated in FIG. 1 as being located in the core network 140, but may be external to the core network 140, e.g., in an NG-RAN. For example, the LMF 120 may be co-located or integrated with a gNB or a TRP, or may be disposed remote from the gNB and/or the TRP and configured to communicate directly or indirectly with the gNB and/or the TRP.

With a UE-assisted position method, the UE, e.g., UE 105A or UE 105B may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE, e.g., UE 105A or UE 105B, may obtain location measurements (e.g., which may be the same as or similar to location measurements for a UE-assisted position method) and may compute a location of the UE (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114), sidelink UEs, or APs may obtain location measurements (e.g., measurements of RSSI, RTT, RSRP, RSRQ, AOA, AOD, or Time of Arrival (ToA) for signals transmitted by the UE, e.g., UE 105A or UE 105B) and/or may receive measurements obtained by the UE. The one or more base stations or APs may send the measurements to a location server (e.g., the LMF 120) for computation of a location estimate for the UE.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UEs 105 as assistance data in an LPP and/or NPP message via the NG-RAN 135 and the 5GC 140.

An LPP or NPP message sent from the LMF 120 to the UEs 105 may instruct the UEs 105 to do any of a variety of things depending on desired functionality. For example, the LPP or NPP message could contain an instruction for the UEs 105 to obtain measurements for GNSS (or A-GNSS), WLAN, E-CID, and/or TDOA (or some other position method). In the case of E-CID, the LPP or NPP message may instruct the UEs 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UEs 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UEs 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UEs 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UEs 105. In these other embodiments, positioning of the UEs 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

Positioning for UEs in a radio network, such as communication system 100 shown in FIG. 1, typically uses Uu interfaces, i.e., radio interface between the UE and the radio access network to support uplink-based positioning and downlink-based positioning. In uplink based positioning, the UE 105 transmit SRS and the base stations (e.g., gNB(s)) 110 receive the SRS and perform measurements. The SRS is transmitted by the UE 105 without other signals in the same OFDM symbols. For downlink based positioning, the base stations (e.g., gNB(s)) 110 transmit PRS and UEs 105 receive the PRS and perform measurements. The PRS is transmitted by the base stations 110 without other signals in the same OFDM symbols. For uplink or downlink based positioning, the network, e.g., a gNB 110 (or a location server), schedules or configures transmission times for the SRS and/or the PRS, and both the transmitting entity and the receiving entity is aware of the scheduled or configured transmissions times.

Positioning for UEs may use sidelink PRS (sometimes referred to as SL PRS), which may be a specific sidelink defined reference signal for positioning or may reuse Uu PRS, e.g., UL PRS, sometimes referred to as Sounding Reference Signal for positioning (SRSPos), or other reference signals may be transmitted in the sidelink channel. Sidelink positioning may enhance UE positioning by providing an additional transmission (or reception) node. A sidelink UE, such as UE 105B, with a known position may be used to support position determination of a target UE, such as UE 105, where the sidelink UE is sometimes referred to as an anchor node.

The SL PRS may potentially be transmitted in the same carrier as the sidelink communications that are used to initiate or configure the sidelink positioning or ranging session. Alternatively, SL PRS may potentially be transmitted in a different carrier than the sidelink communications used to initiate or configure the sidelink positioning or ranging session. For example, the different carrier may be in the same frequency band or may be in a different frequency band. The frequency band(s) used in SL positioning may be unlicensed, in addition to licensed bands and dedicated bands. For example, the frequency band(s) used for transmitting the SL PRS, may be unlicensed, while the licensed bands or dedicated bands may be used to initiate or configure the sidelink positioning or ranging session.

With a sidelink positioning method, a UE 105A for example may transmit a sidelink PRS or sidelink SRS signal which is received and measured by UE 105B. In addition or instead, the UE 105B for example may transmit a sidelink PRS or sidelink SRS signal which is received and measured by the UE 105A. Measurements of SL PRS or SL SRS signals may include Rx-Tx, TOA, RSRP, RSRQ, AOA. SL position methods may include SL RTT (also referred to as ranging), SL AOA and SL AOD. In some scenarios a group of UEs (not shown in FIG. 1) may support SL positioning. In this case, one UE in the group may transmit an SL PRS or SL SRS signal which may be measured by some or all other UEs in the group. Some or all other UEs in the group may also transmit an SL PRS or SL SRS signal (e.g. with each UE transmitting SL SRS or SL PRS at a different time or times than times at which other UEs in the group transmit SL PRS or SL SRS) which may be measured by some or all other UEs in the group different to the UE transmitting the UL PRS or ULS SRS. Measurements made by UEs applicable to transmission of SL PRS or SL SRS by a group of UEs may include Rx-Tx, TOA, RSTD, AOA, RSRP, RSRQ. Position methods supported by these measurements may include sidelink RTT (e.g. ranging), sidelink AOA, sidelink AOD, sidelink TDOA (SL-TDOA). Based on the measurements and the position methods(s), each UE may determine a relative location of itself and/or of other UEs or absolute locations. For example, a relative location of a UE may comprise a location of the UE relative to one or more other UEs in the group.

Sidelink positioning may be used for positioning of UEs independently of the core network. One example implementation of sidelink positioning may be found in vehicular communication systems, such as V2X, which may be used for safety related applications, such as safety warnings, traffic congestions (e.g., automated traffic control), and coordinated or automated vehicle maneuvering. Sidelink positioning, for example, may be used between UEs, including between UEs, RSUs, and PRUs with network access independence. The sidelink positioning may be used with a pair of UEs (e.g., ranging), groups of UEs (V2X), and UE membership in multiple groups. By way of example, sidelink positioning may provide support for various position techniques currently standardized, e.g., in Release 18, such as PRS RTT, AoA, DAoA, AoD, DAoD, but also enable the addition of other PRS capabilities and non-PRS methods in later Releases. Standardization of sidelink positioning may be undertaken in the future.

Figure 2:
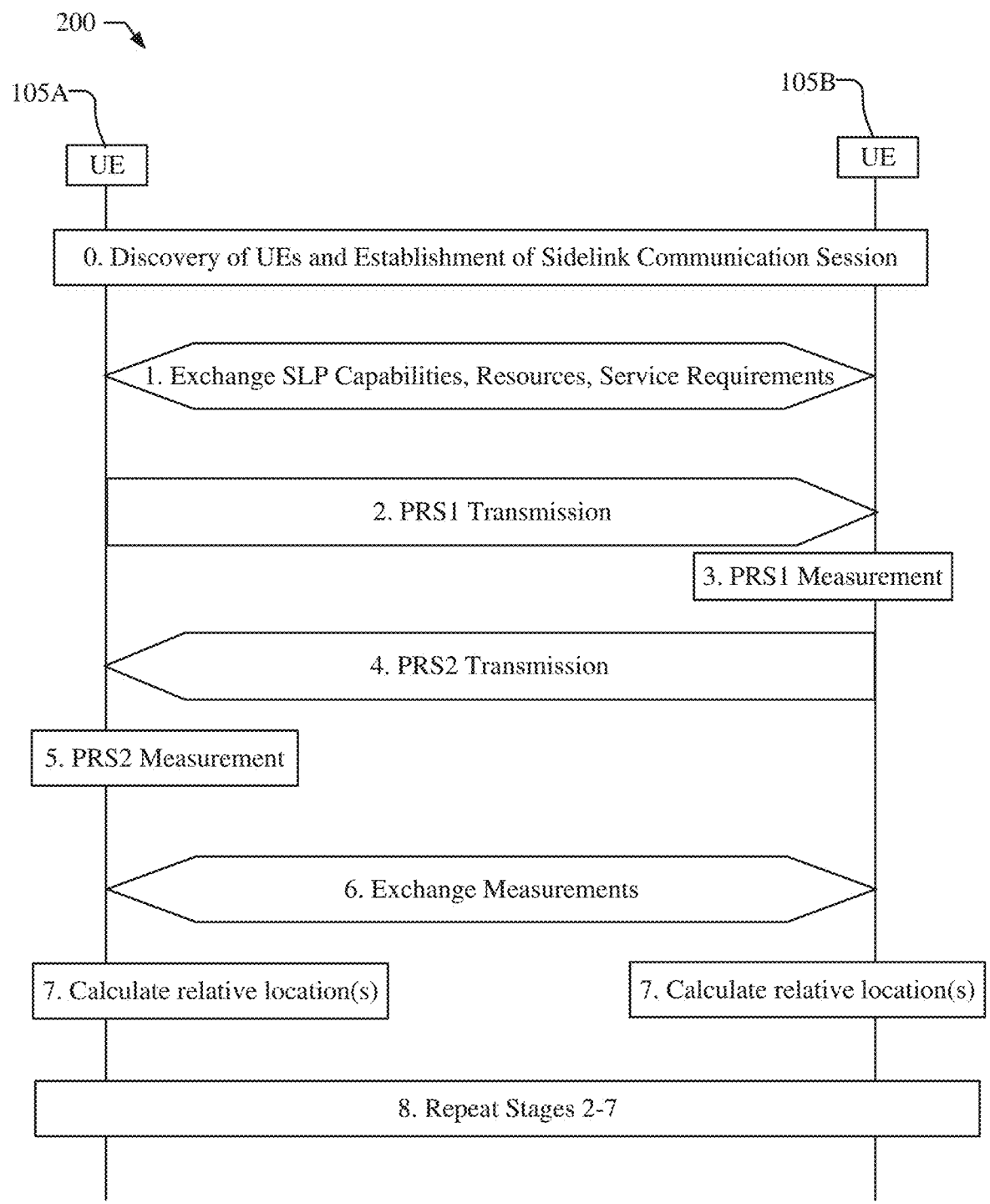
FIG. 2 illustrates a signal flow for signaling between UEs for pairwise sidelink positioning.

FIG. 2 by way of example, is a signal flow 200 illustrating signaling between UE 105A and UEs 105B for pairwise sidelink positioning. The UE 105A and 105B, for example, may be, e.g., the UEs illustrated in FIG. 1. The sidelink positioning illustrated in FIG. 2 is independent of a network.

At stage 0 of FIG. 2, discovery of UEs and establishment of the sidelink communication session is performed. The discover process may be request-response or announcement based. The discovery phase, for example, may be implemented by one or both of UEs 105A and 105B to detect other UEs that are available for sidelink positioning. For example, discovery messages may be exchanged between UE 105A and/or 105B to determine nearby UEs that are available to participate in sidelink positioning. Additional messages may be exchanged to establish the sidelink positioning session between UEs 105A and 105B. For example, the UEs may exchange one or more group criteria parameters for group formation, such as relative distance between UEs, the period of time that a UE will be in communication with other UEs, direction and/or speed of travel of the UEs. Based on the group criteria parameters, the UEs may determine whether to form a group, e.g., determine a group status indication for the other UE indicating inclusion in a group with the UE or exclusion of the other UE from a group with UE. In FIG. 2, for example, it is assumed that the UEs 105A and 105B meet the one or more group criteria and are included in the group (e.g., group of two UEs).

At stage 1, the UEs 105A and 105B may exchange SLP capabilities, resources, service requirement, which may include QoS, for example, using Request Capabilities and Resources and Provide Capabilities and Resources messages as discussed above. The capabilities that are exchanged may define what each of the UEs 105A and 105B is implemented to support. The resources that are exchanged define what capabilities that each of the UEs 105A and 105B is permitted to support, the capabilities that each of the UEs 105A and 105B is not permitted to support, or both. The sidelink positioning capabilities that the UE is permitted to support or not permitted to support may include permission or restrictions on one or more of the sidelink PRS transmission time, sidelink PRS measurement time, sidelink PRS transmission duration, sidelink PRS measurement duration, bandwidth of sidelink PRS transmission, bandwidth of sidelink PRS that is measured, RF frequency of sidelink PRS transmission, RF frequency of sidelink PRS that is measured, signal coding of sidelink PRS transmissions, signal coding of sidelink PRS that is measured, periodicity of sidelink PRS transmissions, periodicity of sidelink PRS that is measured, transmission power for sidelink PRS transmission, transmission power for sidelink PRS that is measured, or any combination thereof. The service requirement includes an indication of at least one of an immediate location, a deferred location, a periodic location, a triggered location, a relative location, a global location, a location accuracy, a location latency, a location periodicity, a location reliability, or some combination of these. The quality of service (QoS) that is exchanged defines the type of location (e.g., single or periodic), accuracy, latency, periodicity, reliability that each UE requires or expects in the sidelink positioning session.

At stage 2, the UE 105A transmits positioning signals PRS1. The configuration of PRS1, for example, may be defined based on the capabilities, resources and service requirement which may include QoS of UE 105A and 105B. The PRS1 configuration, for example, may be the same as or similar to PRS configurations defined in 3GPP TS 37.355 for LPP except that they may refer to PRS transmission on a sidelink communication channel between two UEs or between a group of UEs.

At stage 3, the UE 105B measures the positioning signals PRS1. The UE 105B, for example, may measure RSSI, RTT, RSRP, RSRQ, AOA, AOD, TOA, of the PRS1 transmitted by UE 105A.

At stage 4, the UE 105B transmits positioning signals PRS2. Similar to PRS1, discussed in stage 2, the configuration of PRS2, for example, may be defined based on the capabilities, resources and service requirement which may include QoS of UE 105A and 105B. The PRS2 configuration, for example, may be the same as or similar to PRS configurations defined in 3GPP TS 37.355 for LPP except that they may refer to PRS transmission on a sidelink communication channel between two UEs or between a group of UEs.

At stage 5, the UE 105A measures the positioning signals PRS2. The UE 105A, for example, may measure RSSI, RTT, RSRP, RSRQ, AOA, AOD, TOA, of the PRS2 transmitted by UE 105B.

At stage 6, the UE 105A and UE 105B exchange measurements. The exchange of measurements, for example, may indicate the time of departure (TOD), AOD, signal strength, etc. of the transmitted signals, and in some implementations may provide the measurements generated in stages 3 and 5.

At stage 7, the UE 105A and UE 105B may determine the relative location, e.g., range between UE 105A and 105B, and velocities, based on the measurements generated in stages 3 and 5 and received in stage 6. For example, the UEs may determine the range based on the TOD and TOA of the PRS signals. For example, the range may be determined based on the TODi and TOAi for the PRSi signals (where i=1 for PRS transmitted by UE 105A in stage 2 and i=2 for PRS transmitted by UE 105B in stage 4, and c represents the speed of transmission of an electromagnetic wave, e.g., speed of light) as:

$$\text{Range} = \frac{(TOD_1 - TOA_2) - (TOA_1 - TOD_2)}{2c}. \qquad \text{eq. 1}$$

As illustrated in stage 8, stages 2-7 may be repeated as desired.

FIGS. 3A-3D each illustrate slot based sidelink transmissions, with multiple sidelink symbols and illustrate various options for the structure of sidelink positioning signal transmissions. As discussed above in stages 2 and 4, configuration of the positioning signals (PRS1 and PRS2) used in sidelink positioning be similar to PRS configurations defined in 3GPP TS 37.355 for LPP. The radio resources in NR, for example, are defined in time and frequency domains, and sidelink may have the same or similar radio frames, sub frames, and slots as NR uplink/downlink, as defined in 3GPP TS 38.211. Sidelink communications may also support different numerologies with shorter slot times, e.g., for low latency requirements.

FIG. 3A, for example, illustrates a sidelink transmission structure 300 with PRS 301 from a single UE (e.g., UE0). Sidelink transmission structure 300 is an example of slot format for sidelink transmissions and may be the same or similar to the NR slot format for downlink and uplink transmissions. As illustrated, each slot in sidelink transmission structure 300 may include a physical sidelink shared channel (PSSCH) 304, a physical sidelink control channel (PSCCH) 306, an automatic gain control (AGC) 308 and guard (GAP) symbol 310. In some implementations, the sidelink transmission structure 300 may include additional or other channels, such as a Physical Sidelink Broadcast Channel (PSBCH), Physical Sidelink Feedback Channel (PSFCH), Demodulation Reference Signals (DM-RS), etc. Each PSSCH 304 contains, e.g., user data traffic, and is associated with the PSCCH 306. The PSCCH 306 may be transmitted on the same slot as PSSCH 306 and contains control information, i.e., sidelink control information (SCI), which is split into two stages. The 1st stage (SCI-1) is sent on PSCCH 306, which is associated with the PSSCH 304, and the 2nd stage (SCI-2) is sent over the corresponding PSSCH 304. The 2nd stage (SCI-2), for example, may be mapped to contiguous resource blocks (RBs) in PSSCH starting from the first symbol with PSSCH demodulation reference signals (DMRS). The SCI in the 1st stage, for example, may include control information for, among other things, resource allocation, such as priority, frequency and time resource assignment, and resource reservation period, and decoding the second stage control. The SCI in the 2nd-stage may include control information for, among other things, hybrid automatic repeat request (HARQ) process ID, new data indicator, redundancy version, source ID, and destination ID.

As illustrated in FIG. 3A, for positioning operations, the PRS 301 from a single UE may be included in one or more slots of the sidelink transmission structure 300, e.g., with the PRS 301 being transmitted with at least PSCCH 306 and possibly PSSCH 304.

FIG. 3B illustrates another sidelink transmission structure 320 with standalone PRS from a number of UEs. The standalone PRS from each UE, e.g., PRS0 321 from UE0, PRS1 323 from UE1, and PRS2 325 from UE2, for example, may be transmitted in multiple slots with no other signals.

FIG. 3C illustrates another sidelink transmission structure 340, similar to sidelink transmission structure 300 shown in FIG. 3A, but with transmission of PRS from multiple UEs. For example, PRS from each UE, e.g., PRS0 341 from UE0, PRS1 343 from UE1, and PRS2 345 from UE2 transmitted in multiple slots along with PSSCH 344, PSCCH 346, AGC 348, and guard (GAP) symbol 350.

FIG. 3D illustrates another sidelink transmission structure 360, similar to sidelink transmission structure 340 shown in FIG. 3C with transmission of PRS from multiple UEs. For example, PRS from each UE, e.g., PRS0 361 from UE0, PRS1 363 from UE1, PRS2 365 from UE2, and PRS3 367 from UE3 transmitted in multiple slots along with PSCCH 366, AGC 368, and guard (GAP) symbol 370.

One aspect of sidelink positioning that will require a solution is how to identify the source of the PRS transmission or the positioning or ranging session associated with a PRS transmission.

In one implementation, a payload-based indication transmitted in L1 or L2 control signaling or higher layer signaling, such as in SCI-2 or MAC-CE, may be used for identifying a SL positioning session. For example, when SL PRS is transmitted with a PSCCH and PRS from a single UE is transmitted in a slot, e.g., as illustrated in FIG. 3A, a source ID provided in L1 or L2 control signaling or higher layer signaling, such as SCI 2nd stage (SCI-2) or MAC-CE, may be used to identify the transmitter of the SL PRS. Additionally, an indication of the positioning/ranging session identifier associated with the SL PRS may also be transmitted in L1 or L2 control signaling or higher layer signaling, such as in SCI-2 or MAC-CE.

Figure 4:
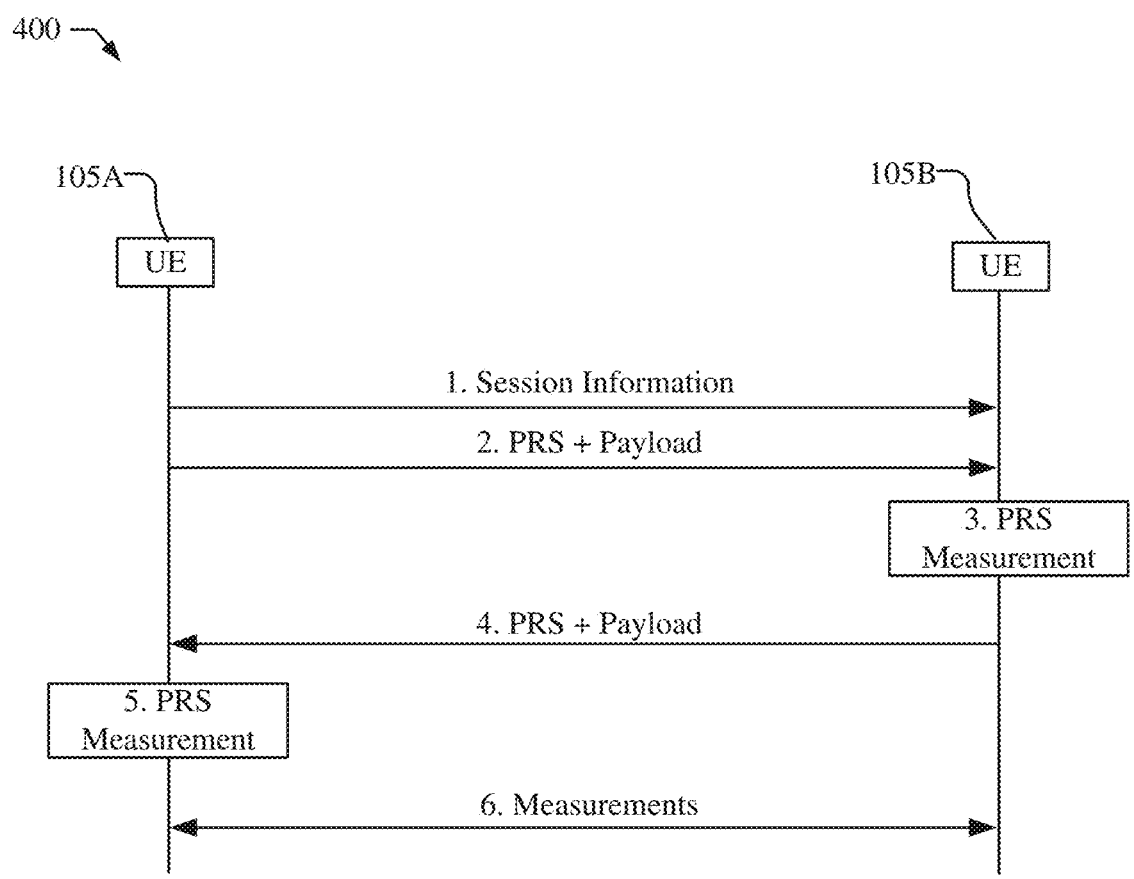
FIG. 4 illustrates a signal flow for a procedure and signaling between UEs for supporting sidelink (SL) positioning in which a payload-based indication of the identity of the SL positioning session is provided with the transmitted SL PRS.

FIG. 4, by way of example, is a signal flow 400 illustrating a procedure and signaling between UEs 105A and 105B for supporting sidelink (SL) positioning in which a payload-based indication of the identity of the SL positioning session is provided with the transmitted SL PRS. The UEs 105A and 105B, for example, may be, e.g., the UEs illustrated in FIGS. 1 and 2, and FIG. 4 may be an extension of FIG. 2. Moreover, in some implementations, additional signaling and/or and additional UEs may be included in the signal flow 400.

As shown in FIG. 4, in stage 1, UE 105A may send a message that includes session information, which may be received by UE 105B. Stage 1 in FIG. 4, for example, may be similar to stage 1 of FIG. 2, and may include an indication of the SL positioning session identifier, as well as identifiers for one or more UEs participating in the SL positioning session. The indication of the SL positioning session identifier may include, e.g., a SL positioning session ID, the initiator UE's expected PRS transmission time, a time indicator (e.g. slot index, direct frame number (DFN) or system frame number (SFN) index, or both) of when the ranging/positioning session was initiated, an indicator of the carrier where the positioning/ranging session was initiated, or any combination thereof. The message may further include a number of UEs participating in the positioning/ranging session, which may be an indication of the SL positioning session identifier. It should be understood that multiple messages may be sent to provide one or more of the indications of the SL positioning session identifier. In some implementations, additional UEs may transmit and/or receive session information in stage 1. For example, UE 105B may transmit session information which is received by UE 105A.

In stage 2, the UE 105A transmits positioning signals, e.g., SL PRS, and a message associated with the SL PRS and that includes a payload with an indication of the SL positioning session identifier associated with the SL PRS, which is received by the UE 105B. The payload further includes an identification of the UE 105A as the source of the transmission of the SL PRS in stage 2. Similar to stage 2 of FIG. 2, the configuration of the SL PRS may be the same as or similar to PRS configurations defined in 3GPP TS 37.355 for LPP except that they may refer to PRS transmission on a sidelink communication channel between two UEs or between a group of UEs. The message with the payload may be provided in L1 or L2 control signaling or higher layer signaling, such as SCI 2nd stage (SCI-2) or MAC-CE.

The payload in stage 2 may include any indication for the SL positioning session identifier. For example, in some implementations, the SL positioning session identifier may be provided in the payload. Additionally or alternatively, other indications of the SL positioning session identifier may be provided. For example, the number of UEs participating in the positioning/ranging session may be transmitted in the payload and used as an indication of the SL positioning session identifier. In an implementation, an initiator UE's expected PRS transmission time may be transmitted in the payload and used as an indication of the SL positioning session identifier. In an implementation, a time indicator (e.g. slot index, DFN/SFN index, or both) of when the ranging/positioning session was initiated may be transmitted in the payload and used as an indication of the SL positioning session identifier. In an implementation, an indicator of the carrier where the positioning/ranging session was initiated may be transmitted and used as an indication of the SL positioning session identifier.

At stage 3, the UE 105B measures the positioning signals PRS received in stage 2. As discussed in FIG. 2, the UE 105B, for example, may measure RSSI, RTT, RSRP, RSRQ, AOA, AOD, TOA, of the PRS transmitted by UE 105A.

In stage 4, similar to stage 2, the UE 105B may transmits positioning signals, e.g., SL PRS, and a message associated with the SL PRS and that includes a payload with an indication of the SL positioning session identifier associated with the SL PRS and an identification of the UE 105B as the source of the transmission of the SL PRS in stage 4, which is received by the UE 105A.

At stage 5, the UE 105A measures the positioning signals PRS received in stage 4. The UE 105A, for example, may measure RSSI, RTT, RSRP, RSRQ, AOA, AOD, TOA, of the PRS transmitted by UE 105B.

At stage 6, the UE 105A and UE 105B may exchange measurements. The exchange of measurements, for example, may indicate the time of departure (TOD), AOD, signal strength, etc. of the transmitted signals, and in some implementations may provide the measurements generated in stages 3 and 5. The UEs 105A and 105B may determine ranges based on the measurements, e.g., as discussed in stage 7 of FIG. 2. Additionally or alternatively, the UEs 105A and 105B may determine relative or absolute locations based on the measurements. Moreover, the UEs 105A and 105B may repeat stages 2-6 as desired.

In one implementation, a sequence-based indication may be used for identifying a SL positioning session. The sequence-based indication in the SL PRS, for example, may be generated based on the SL positioning session identifier and identification of the UE, which may be decoded by the receiving UE. For example, the SL PRS may be generated using a PRS sequence generator, which may be initialized or seeded based the SL positioning session identifier and transmitting UE identifier. In another example, the PRS sequence may be scrambled based on the SL positioning session identifier and transmitting UE identifier. In another example, a cover code may be used with the PRS sequence, where the cover code is based on the SL positioning session identifier and transmitting UE identifier.

Figure 5:
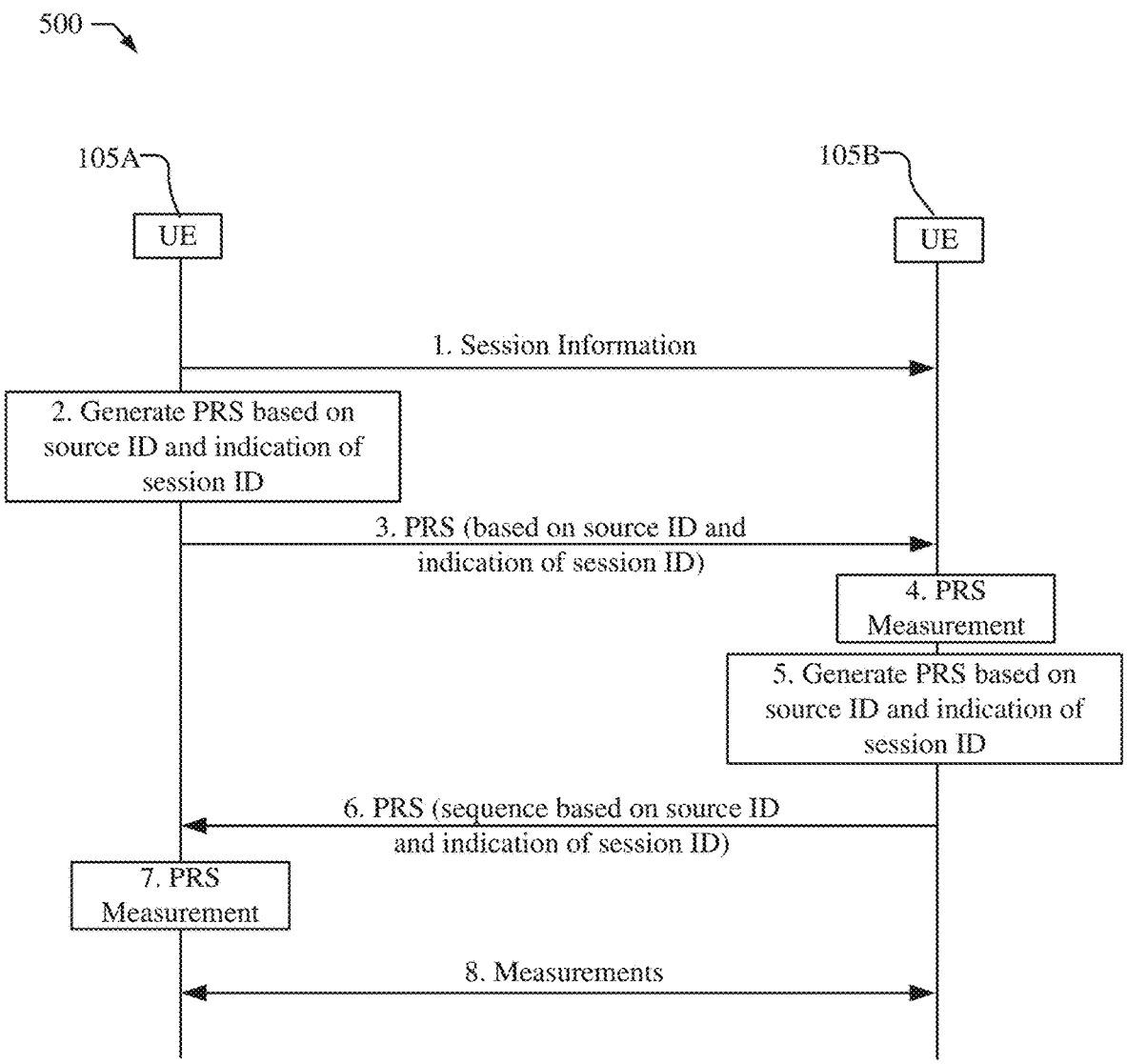
FIG. 5 illustrates a signal flow for a procedure and signaling between UEs for supporting sidelink (SL) positioning in which a sequence-based indication of the identity of the SL positioning session is provided with the transmitted SL PRS.

FIG. 5, by way of example, is a signal flow 500 illustrating a procedure and signaling between UEs 105A and 105B for supporting sidelink (SL) positioning in which a sequence-based indication of the identity of the SL positioning session is provided with the transmitted SL PRS. The UEs 105A and 105B, for example, may be, e.g., the UEs illustrated in FIGS. 1 and 2, and FIG. 5 may be an extension of FIG. 2. Moreover, in some implementations, additional signaling and/or and additional UEs may be included in the signal flow 500.

As shown in FIG. 5, in stage 1, UE 105A may send a message that includes session information, which may be received by UE 105B. Stage 1 in FIG. 4, for example, may be similar to stage 1 of FIG. 2, and may include an indication of the SL positioning session identifier, as well as identifiers for one or more UEs participating in the SL positioning session. The indication of the SL positioning session identifier may include, e.g., a SL positioning session ID, the initiator UE's expected PRS transmission time, a time indicator (e.g. slot index, DFN/SFN index, or both) of when the ranging/positioning session was initiated, an indicator of the carrier where the positioning/ranging session was initiated, or any combination thereof. It should be understood that multiple messages may be sent to provide one or more of the indications of the SL positioning session identifier. In some implementations, additional UEs may transmit and/or receive session information in stage 1. For example, UE 105B may transmit session information which is received by UE 105A.

In stage 2, UE 105A generates PRS based on session information, including an indication of the SL positioning session identifier and source ID, e.g., the identification of the UE 105A. For example, the UE 105A may generate the PRS with a PRS sequence generator that is initialized or seeded based at least one the indication of the SL positioning session identifier and source ID. In another example, the PRS sequence may be scrambled based at least one the indication of the SL positioning session identifier and source ID. In another example, a cover code based at least one the indication of the SL positioning session identifier and source ID may be applied to the PRS. The indication of the SL positioning session identifier, for example, may include one or more of the positioning session initiator UE's ID, an expected PRS transmission time for the initiator UE, positioning/ranging session identifier, a time indicator (e.g. slot index, DFN/SFN index, or both) of when the ranging/positioning session was initiated, an indicator of a carrier frequency in which the positioning session was initiated, or any combination thereof. Additionally or alternatively, a (pre-)configured or separately indicated value may be used.

In stage 3, the UE 105A transmits positioning signals, e.g., SL PRS, which is generated based on at least one the indication of the SL positioning session identifier and source ID in stage 2.

At stage 4, the UE 105B decodes the PRS and measures the positioning signals PRS received in stage 3. The UE 105B may decode the PRS based on the session information received in stage 1, and accordingly, may determine the SL positioning session identifier and the PRS transmitting UE ID. As discussed in FIG. 2, the UE 105B, for example, may measure RSSI, RTT, RSRP, RSRQ, AOA, AOD, TOA, of the PRS transmitted by UE 105A.

At stage 5, the UE 105B generates PRS based on session information, including an indication of the SL positioning session identifier and the source ID, e.g., the identification of the UE 105B. The generation of the PRS by UE 105B in stage 5 may be the same or similar to that discussed in reference to stage 2.

In stage 6, the UE 105B transmits positioning signals, e.g., SL PRS, which is generated based on at least one the indication of the SL positioning session identifier and source ID in stage 5.

At stage 7, the UE 105A decodes the PRS and measures the positioning signals PRS received in stage 6. The UE 105A may decode the PRS based on the session information received in stage 1, and accordingly, may determine the SL positioning session identifier and the PRS transmitting UE ID. As discussed in FIG. 2, the UE 105A, for example, may measure RSSI, RTT, RSRP, RSRQ, AOA, AOD, TOA, of the PRS transmitted by UE 105B.

At stage 8, the UE 105A and UE 105B may exchange measurements. The exchange of measurements, for example, may indicate the time of departure (TOD), AOD, signal strength, etc. of the transmitted signals, and in some implementations may provide the measurements generated in stages 3 and 5. The UEs 105A and 105B may determine ranges based on the measurements, e.g., as discussed in stage 7 of FIG. 2. Additionally or alternatively, the UEs 105A and 105B may determine relative or absolute locations based on the measurements. Moreover, the UEs 105A and 105B may repeat stages 2-6 as desired.

Figure 6:
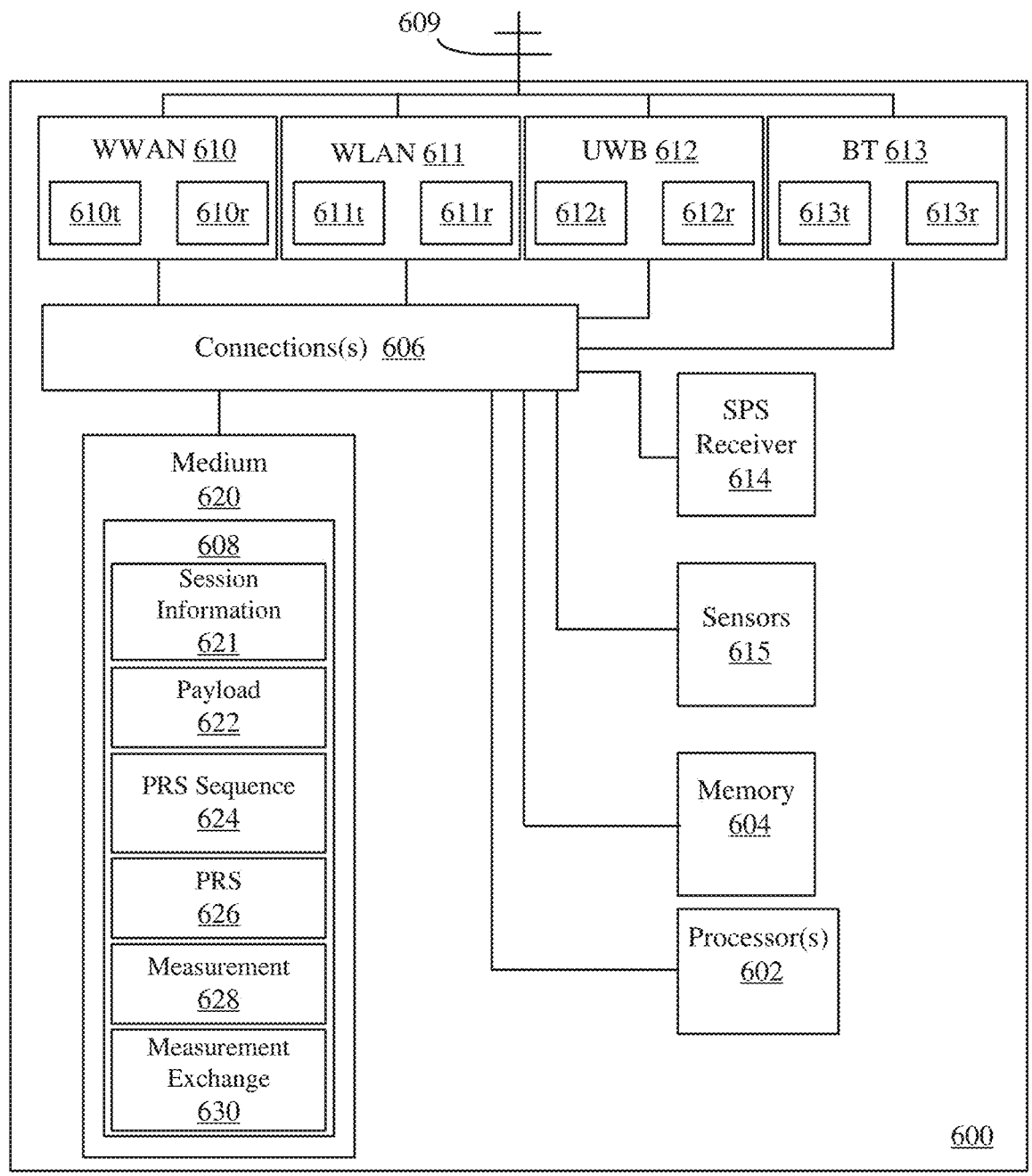
FIG. 6 illustrates a schematic block diagram illustrating certain exemplary features of a UE configured to support sidelink positioning operations using a payload-based indication or a sequence-based indication of the identity of the SL positioning session and source ID.

FIG. 6 shows a schematic block diagram illustrating certain exemplary features of a UE 600, e.g., which may be UE 105 shown in FIGS. 1, 2, and 4, configured for supporting sidelink positioning operations using a payload-based indication or a sequence-based indication of the identity of the SL positioning session and source ID, as described herein. The UE 600, for example, may perform the signal flows 400 and 500 shown in FIGS. 4 and 5 and the process flows 600 and 700, shown in FIGS. 6 and 7, and accompanying techniques as discussed herein. The UE 600 may include, for example, one or more processors 602, memory 604, an external interface such as at least one wireless transceivers (e.g., wireless network interface) illustrated as WWAN transceiver 610, WLAN transceiver 611, an Ultra-Wideband (UWB) transceiver 612 and a Bluetooth (BT) transceiver 613, SPS receiver 614, and one or more sensors 615, which may be operatively coupled with one or more connections 606 (e.g., buses, lines, fibers, links, etc.) to non-transitory computer readable medium 620 and memory 604. The SPS receiver 614, for example, may receive and process SPS signals from satellite vehicles 190 shown in FIG. 1. The one or more sensors 615, for example, may be an inertial measurement unit (IMU) that may include one or more accelerometers, one or more gyroscopes, a magnetometer, etc. The UE 600 may further include additional items, which are not shown, such as a user interface that may include e.g., a display, a keypad or other input device, such as virtual keypad on the display, through which a user may interface with the UE. In certain example implementations, all or part of UE 600 may take the form of a chipset, and/or the like.

The UE 600 may include at least one wireless transceiver, such as wireless transceiver 610 for a WWAN communication system and wireless transceiver 611 for a WLAN communication system, UWB transceiver 612 for a UWB communication system, BT transceiver 613 for a Bluetooth communication system, or a combined transceiver for any of WWAN, WLAN, UWB, and BT. The WWAN transceiver 610 may include a transmitter 610t and receiver 610r coupled to one or more antennas 609 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The WLAN transceiver 611 may include a transmitter 611t and receiver 611r coupled to one or more antennas 609 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The UWB transceiver 612 may include a transmitter 612t and receiver 612r coupled to one or more antennas 609 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The BT transceiver 613 may include a transmitter 613t and receiver 613r coupled to one or more antennas 609 or to separate antennas, for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. The transmitters 610t, 611t, 612t, and 613t may include multiple transmitters that may be discrete components or combined/integrated components, and/or the receivers 610r, 611r, 612r, and 613r may include multiple receivers that may be discrete components or combined/integrated components. The WWAN transceiver 610 may be configured to communicate signals (e.g., with base stations and/or one or more other devices) according to a variety of radio access technologies (RATs) such as 6G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), etc. New Radio may use mm-wave frequencies and/or sub-6 GHz frequencies. The WLAN transceiver 611 may be configured to communicate signals (e.g., with access points and/or one or more other devices) according to a variety of radio access technologies (RATs) such as 3GPP LTE-V2X (PC5), IEEE 1102.11 (including IEEE 1102.11p), WiFi, WiFi Direct (WiFi-D), Zigbee etc. The UWB transceiver 612 may be configured to communicate signals (e.g., with access points and/or one or more other devices) according to a variety of radio access technologies (RATs) such as personal area network (PAN) including IEEE 802.15.3, IEEE 802.15.4, etc. The BT transceiver 613 may be configured to communicate signals (e.g., with access points and/or one or more other devices) according to a variety of radio access technologies (RATs) such as a Bluetooth network. The transceivers 610 611, 612, and 613 may be communicatively coupled to a transceiver interface, e.g., by optical and/or electrical connection, which may be at least partially integrated with the transceivers 610, 611, 612, 613.

In some embodiments, UE 600 may include antenna 609, which may be internal or external. UE antenna 609 may be used to transmit and/or receive signals processed by wireless transceivers 610, 611, 612, 613. In some embodiments, UE antenna 609 may be coupled to wireless transceivers 610, 611, 612, 613. In some embodiments, measurements of signals received (transmitted) by UE 600 may be performed at the point of connection of the UE antenna 609 and wireless transceivers 610, 611, 612, 613. For example, the measurement point of reference for received (transmitted) RF signal measurements may be an input (output) UE of the receiver 610r (transmitter 610t) and an output (input) UE of the UE antenna 609. In a UE 600 with multiple UE antennas 609 or antenna arrays, the antenna connector may be viewed as a virtual point representing the aggregate output (input) of multiple UE antennas.

The one or more processors 602 may be implemented using a combination of hardware, firmware, and software. The one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of UE 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in UE 600 is merely exemplary, and as such the functionality of the modules and/or data structures may be combined, separated, and/or be structured in different ways depending upon the implementation of the UE 600.

The medium 620 and/or memory 604 may include a session information module 621 that when implemented by the one or more processors 602 configures the one or more processors 602 to transmit or receive, via the transceivers 610-613, session information, which may include, e.g., an indication of a SL positioning session identifier. The indication of the SL positioning session identifier, for example, may include, e.g., a SL positioning session ID, a number of UEs participating in the positioning/ranging session, the initiator UE's expected PRS transmission time, a time indicator (e.g. slot index, DFN/SFN index, or both) of when the ranging/positioning session was initiated, an indicator of the carrier where the positioning/ranging session was initiated, or any combination thereof.

The medium 620 and/or memory 604 may include a payload module 622 that when implemented by the one or more processors 602 configures the one or more processors 602 to generate a payload associated with a SL PRS that includes, e.g., an identification of the UE as a source of transmission of the SL PRS and an indication of a SL positioning session identifier. The one or more processors 602 may be configured to transmit the payload, or to receive a payload from another UE, e.g., via the transceivers 610-613, e.g., using L1 or L2 control signaling, such as a SCI-2nd stage message or a MAC-CE message. The indication of the SL positioning session identifier, for example, may include, e.g., a SL positioning session ID, a number of UEs participating in the positioning/ranging session, the initiator UE's expected PRS transmission time, a time indicator (e.g. slot index, DFN/SFN index, or both) of when the ranging/positioning session was initiated, an indicator of the carrier where the positioning/ranging session was initiated, or any combination thereof.

The medium 620 and/or memory 604 may include a PRS sequence module 624 that when implemented by the one or more processors 602 configures the one or more processors 602 to generate PRS. In some implementations, the one or more processors 602 may be configured to generate SL PRS based on indication of the SL positioning session identifier and identification of the UE. For example, the indication of the SL positioning session identifier, for example, may include, e.g., a SL positioning session ID, a number of UEs participating in the positioning/ranging session, the initiator UE's expected PRS transmission time, a time indicator (e.g. slot index, DFN/SFN index, or both) of when the ranging/positioning session was initiated, an indicator of the carrier where the positioning/ranging session was initiated, or any combination thereof. The one or more processors 602, for example, may be configured to generate the SL PRS by initializing or seeding the generation of a SL PRS sequence based on the indication of the SL positioning session identifier and the identification of the UE, or to scramble a SL PRS sequence based on the indication of the SL positioning session identifier and the identification of the UE, or to generate a cover code based on the indication of the SL positioning session identifier and the identification of the UE that is applied to the SL PRS sequence. The one or more processors 602, for example, may be further configured to determine the SL positioning session identifier and PRS source identifier from received SL PRS, which is encoded with an indication of the SL positioning session identifier and identification of the transmitting UE.

The medium 620 and/or memory 604 may include a PRS module 626 that when implemented by the one or more processors 602 configures the one or more processors 602 to transmit or receive SL PRS, e.g., via the transceivers 610-613.

The medium 620 and/or memory 604 may include a measurement module 628 that when implemented by the one or more processors 602 configures the one or more processors 602 to generate a measurement for received SL PRS. The measurements, for example, may include RSSI, RTT, RSRP, RSRQ, AOA, AOD, TOA, etc.

The medium 620 and/or memory 604 may include a measurement exchange module 630 that when implemented by the one or more processors 602 configures the one or more processors 602 to transmit, e.g., via the transceivers 610-613, an indication of the measurement for the SL PRS. The one or more processors 602 may be further configured to receive, e.g., via the transceivers 610-613, an indication of the measurement for SL PRS from another UE.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support sidelink positioning using an indication of the identity of the SL positioning session and source ID in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include an external interface including one or more of wireless transceivers 610, 611, 612, and 613 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
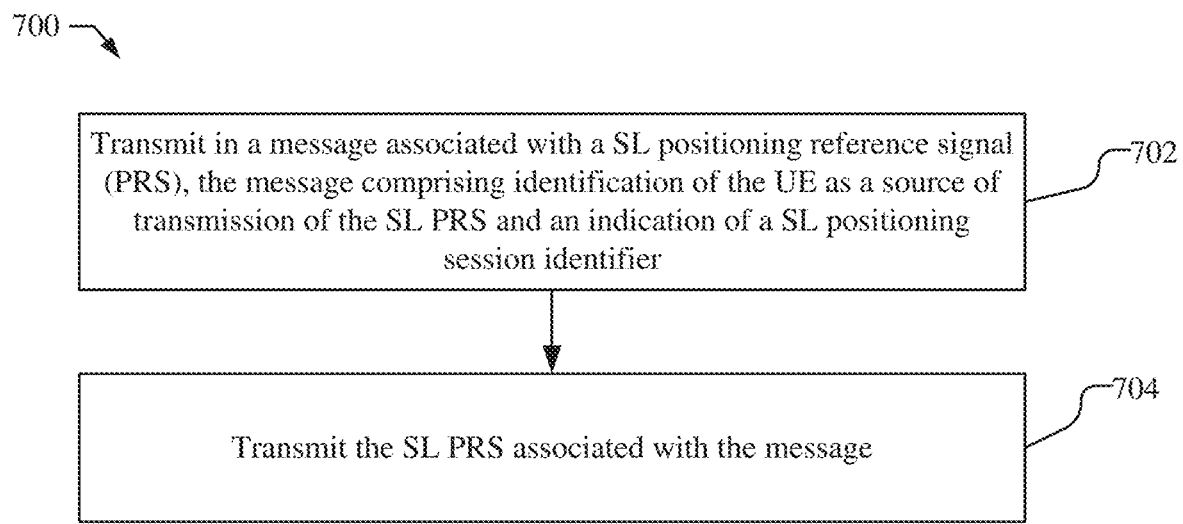
FIG. 7 illustrates a flowchart for an exemplary method for supporting SL positioning using a payload-based indication of the identity of the SL positioning session.

FIG. 7 shows a flowchart for an exemplary method 700, e.g., performed by a UE such as UE 105 or UE 600 in FIGS. 1, 4, and 6, for supporting sidelink (SL) positioning, e.g., using a payload-based indication of the identity of the SL positioning session, in a manner consistent with disclosed implementations.

At block 702, the UE transmits in a message associated with a SL positioning reference signal (PRS), the message comprising identification of the UE as a source of transmission of the SL PRS and an indication of a SL positioning session identifier, e.g., as discussed in stage 2 of FIG. 4. In one implementation, the message may be transmitted using Layer 1 (L1) or Layer 2 (L2) control signaling or higher layer signaling. The L1 or L2 control signaling, for example, may be a Sidelink Control Information (SCI) second stage message or a Medium Access Control-Control Element (MAC-CE) message. A means for transmitting in a message associated with a SL positioning reference signal (PRS), the message comprising identification of the UE as a source of transmission of the SL PRS and an indication of a SL positioning session identifier may include, e.g., one of transceivers 610-613 and one or more processors 602 configured with dedicated hardware or implementing executable code or software instructions in memory 604 and/or medium 620, such as the payload module 622 of UE 600.

At block 704, the UE transmits the SL PRS associated with the message, e.g., as discussed in stage 2 of FIG. 4. A means for transmitting the SL PRS associated with the message may include, e.g., one of transceivers 510-513 and one or more processors 602 configured with dedicated hardware or implementing executable code or software instructions in memory 604 and/or medium 620, such as the PRS module 626 of UE 600.

In one implementation, the indication of the SL positioning session identifier may be an identifier associated with the SL positioning session, as discussed in stage 2 of FIG. 4. In one implementation, the indication of the SL positioning session identifier comprises an expected PRS transmission time for a second UE that initiated the SL positioning session, as discussed in stage 2 of FIG. 4. In one implementation, the indication of the SL positioning session identifier comprises a time indicator of when the SL positioning session was initiated, as discussed in stage 2 of FIG. 4. In one implementation, the indication of the SL positioning session identifier comprises an indicator of a carrier frequency in which the SL positioning session was initiated, as discussed in stage 2 of FIG. 4. In one implementation, the message may further include a number of UEs participating in the SL positioning session.

In one implementation, the UE may receive a second message associated with a second SL PRS, the second message may include identification of a second UE as a source of transmission of the second SL PRS and the indication of the SL positioning session identifier, e.g., as discussed in stage 4 of FIG. 4. The UE may further receive the second SL PRS associated with the message, e.g., as discussed in stage 4 of FIG. 4. The UE may generate a measurement for the second SL PRS, e.g., as discussed in stage of FIG. 4. The UE may transmit an indication of the measurement for the second SL PRS, e.g., as discussed in stage 6 of FIG. 4. In some implementations, the UE may include an indication of the session ID with the measurement of the second SL PRs. A means for receiving a second message associated with a second SL PRS, the second message comprising identification of a second UE as a source of transmission of the second SL PRS and the indication of the SL positioning session identifier may include, e.g., one of transceivers 510-513 and one or more processors 602 configured with dedicated hardware or implementing executable code or software instructions in memory 604 and/or medium 620, such as the payload module 622 of UE 600. A means for receiving the second SL PRS associated with the message may include, e.g., one of transceivers 510-513 and one or more processors 602 configured with dedicated hardware or implementing executable code or software instructions in memory 604 and/or medium 620, such as the PRS module 626 of UE 600. A means for generating a measurement for the second SL PRS may include, e.g., one or more processors 602 configured with dedicated hardware or implementing executable code or software instructions in memory 604 and/or medium 620, such as the measurement module 628 of UE 600. A means for transmitting an indication of the measurement for the second SL PRS may include, e.g., one of transceivers 510-513 and one or more processors 602 configured with dedicated hardware or implementing executable code or software instructions in memory 604 and/or medium 620, such as the measurement exchange module 630 of UE 600.

Figure 8:
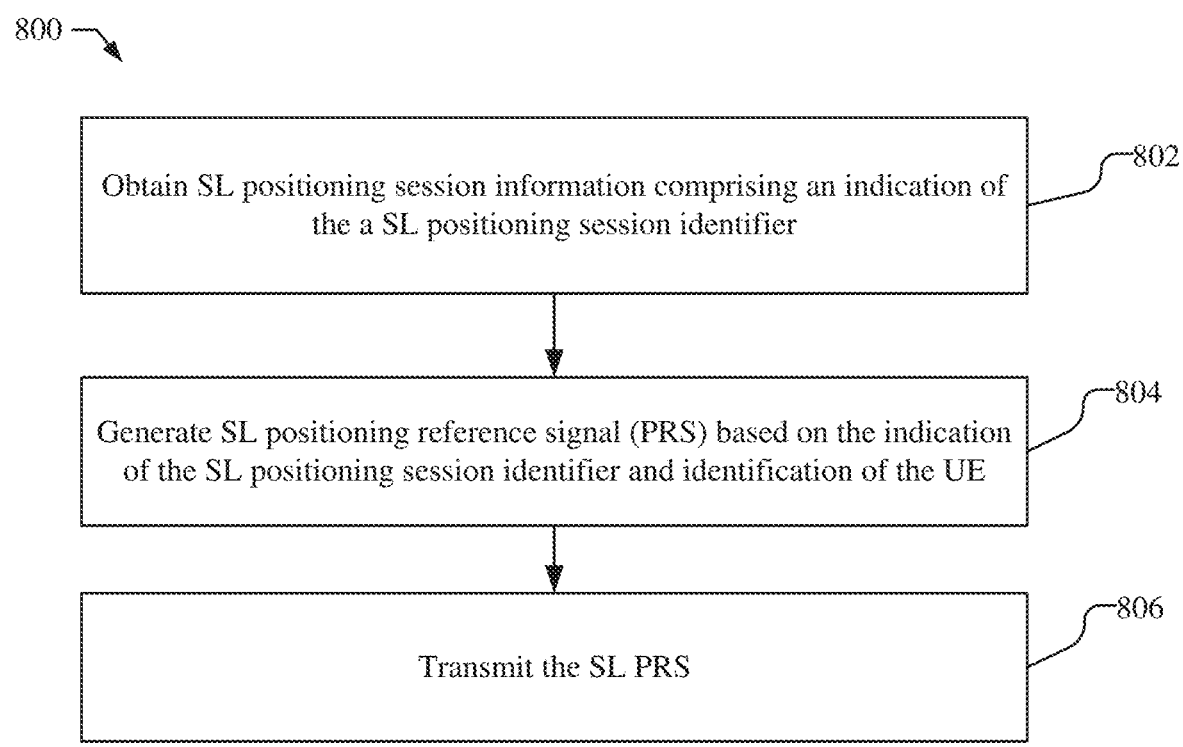
FIG. 8 illustrates a flowchart for an exemplary method for supporting SL positioning using a payload-based indication of the identity of the SL positioning session.

FIG. 8 shows a flowchart for an exemplary method 800, e.g., performed by a UE such as UE 105 or UE 600 in FIGS. 1, 5, and 6, for supporting sidelink (SL) positioning, e.g., using a sequence-based indication of the identity of the SL positioning session, in a manner consistent with disclosed implementations.

At block 802, the UE obtains SL positioning session information comprising an indication of a SL positioning session identifier, e.g., as discussed in stage 1 of FIG. 5. A means for obtaining SL positioning session information comprising an indication of a SL positioning session identifier may include, e.g., one of transceivers 510-513 and one or more processors 602 configured with dedicated hardware or implementing executable code or software instructions in memory 604 and/or medium 620, such as the session information module 621 of UE 600.

At block 804, the UE generates SL positioning reference signal (PRS) based on the indication of the SL positioning session identifier and identification of the UE, e.g., as discussed stage 2 of FIG. 5. In one implementation, the indication of the SL positioning session identifier may be any of an identifier associated with the SL positioning session, an expected PRS transmission time for a second UE that initiated the SL positioning session, a time indicator of when the SL positioning session was initiated, an indicator of a carrier frequency in which the SL positioning session was initiated, or any combination thereof, e.g., as discussed in stage 2 of FIG. 5. A means for generating SL positioning reference signal (PRS) based on the indication of the SL positioning session identifier and identification of the UE may include, e.g., one or more processors 602 configured with dedicated hardware or implementing executable code or software instructions in memory 604 and/or medium 620, such as the PRS sequence module 624 of UE 600.

At block 806, the UE transmits the SL PRS, e.g., as discussed in stage 3 of FIG. 5. A means for transmitting the SL PRS may include, e.g., one of transceivers 510-513 and one or more processors 602 configured with dedicated hardware or implementing executable code or software instructions in memory 604 and/or medium 620, such as the PRS module 626 of UE 600.

In one implementation, the SL PRS is generated based on the indication of the SL positioning session identifier and the identification of the UE by initializing or seeding generation of a SL PRS sequence based on the indication of the SL positioning session identifier and the identification of the UE, e.g., as discussed in stage 2 of FIG. 5. A means for initializing or seeding generation of a SL PRS sequence based on the indication of the SL positioning session identifier and the identification of the UE may include, e.g., one or more processors 602 configured with dedicated hardware or implementing executable code or software instructions in memory 604 and/or medium 620, such as the PRS sequence module 624 of UE 600.

In one implementation, the SL PRS is generated based on the indication of the SL positioning session identifier and the identification of the UE by scrambling a SL PRS sequence based on the indication of the SL positioning session identifier and the identification of the UE, e.g., as discussed in stage 2 of FIG. 5. A means for scrambling a SL PRS sequence based on the indication of the SL positioning session identifier and the identification of the UE may include, e.g., one or more processors 602 configured with dedicated hardware or implementing executable code or software instructions in memory 604 and/or medium 620, such as the PRS sequence module 624 of UE 600.

In one implementation, the SL PRS is generated based on the indication of the SL positioning session identifier and the identification of the UE by applying a cover code to a SL PRS sequence, wherein the cover code is based on the indication of the SL positioning session identifier and the identification of the UE, e.g., as discussed in stage 2 of FIG. 5. A means for applying a cover code to a SL PRS sequence, wherein the cover code is based on the indication of the SL positioning session identifier and the identification of the UE, may include, e.g., one or more processors 602 configured with dedicated hardware or implementing executable code or software instructions in memory 604 and/or medium 620, such as the PRS sequence module 624 of UE 600.

In one implementation, the UE may receive a second SL PRS from a second UE, the second SL PRS generated based on the indication of the SL positioning session identifier and identification of the second UE, e.g., as discussed in stages 5 and 6 of FIG. 5. The UE may determine the SL positioning session from the second SL PRS, e.g., as discussed in stage 6 of FIG. 5. The UE may generate a measurement for the second SL PRS, e.g., as discussed in stage 7 of FIG. 5. The UE may transmit an indication of the measurement for the second SL PRS, e.g., as discussed in stage 8 of FIG. 5. A means for receiving a second SL PRS from a second UE, the second SL PRS generated based on the indication of the SL positioning session identifier and identification of the second UE may include, e.g., one of transceivers 510-513 and one or more processors 602 configured with dedicated hardware or implementing executable code or software instructions in memory 604 and/or medium 620, such as the PRS module 626 of UE 600. A means for determining the SL positioning session from the second SL PRS may include, e.g., one or more processors 602 configured with dedicated hardware or implementing executable code or software instructions in memory 604 and/or medium 620, such as the PRS sequence module 624 of UE 600. A means for generating a measurement for the second SL PRS may include, e.g., one or more processors 602 configured with dedicated hardware or implementing executable code or software instructions in memory 604 and/or medium 620, such as the measurement module 628 of UE 600. A means for transmitting an indication of the measurement for the second SL PRS may include, e.g., one of transceivers 510-513 and one or more processors 602 configured with dedicated hardware or implementing executable code or software instructions in memory 604 and/or medium 620, such as the measurement exchange module 630 of UE 600.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

While some of the techniques, processes, and/or implementations presented herein may comply with all or part of one or more standards, such techniques, processes, and/or implementations may not, in some embodiments, comply with part or all of such one or more standards.

In view of this description embodiments may include different combinations of features. Implementation examples are described in the following numbered clauses:

Clause 1. A method for supporting sidelink (SL) positioning performed by a user equipment (UE), comprising: transmitting in a message associated with a SL positioning reference signal (PRS), the message comprising identification of the UE as a source of transmission of the SL PRS and an indication of a SL positioning session identifier; and transmitting the SL PRS associated with the message.

Clause 2. The method of clause 1, wherein the message is transmitted using Layer 1 (L1) or Layer 2 (L2) control signaling or higher layer signaling.

Clause 3. The method of clause 2, wherein the L1 or L2 control signaling comprises a Sidelink Control Information (SCI) second stage message or a Medium Access Control-Control Element (MAC-CE) message.

Clause 4. The method of any of clauses 1-3, wherein the indication of the SL positioning session identifier comprises an identifier associated with the SL positioning session.

Clause 5. The method of any of clauses 1-4, wherein the indication of the SL positioning session identifier comprises an expected PRS transmission time for a second UE that initiated the SL positioning session.

Clause 6. The method of any of clauses 1-5, wherein the indication of the SL positioning session identifier comprises a time indicator of when the SL positioning session was initiated.

Clause 7. The method of any of clauses 1-6, wherein the indication of the SL positioning session identifier comprises an indicator of a carrier frequency in which the SL positioning session was initiated.

Clause 8. The method of any of clauses 1-7, wherein the message further comprises a number of UEs participating in the SL positioning session.

Clause 9. The method of any of clauses 1-8, further comprising: receiving a second message associated with a second SL PRS, the second message comprising identification of a second UE as a source of transmission of the second SL PRS and the indication of the SL positioning session identifier; receiving the second SL PRS associated with the message; generating a measurement for the second SL PRS; and transmitting an indication of the measurement for the second SL PRS.

Clause 10. A user equipment (UE) configured for supporting sidelink (SL) positioning, comprising: a wireless transceiver configured to wirelessly communicate with network entities; at least one memory; and at least one processor coupled to the wireless transceiver and the at least one memory, the at least one processor configured to: transmit in a message associated with a SL positioning reference signal (PRS), the message comprising identification of the UE as a source of transmission of the SL PRS and an indication of a SL positioning session identifier; and transmit the SL PRS associated with the message.

Clause 11. The UE of clause 10, wherein the message is transmitted using Layer 1 (L1) or Layer 2 (L2) control signaling or higher layer signaling.

Clause 12. The UE of clause 11, wherein the L1 or L2 control signaling comprises a Sidelink Control Information (SCI) second stage message or a Medium Access Control-Control Element (MAC-CE) message.

Clause 13. The UE of any of clauses 10-12, wherein the indication of the SL positioning session identifier comprises an identifier associated with the SL positioning session.

Clause 14. The UE of any of clauses 10-13, wherein the indication of the SL positioning session identifier comprises an expected PRS transmission time for a second UE that initiated the SL positioning session.

Clause 15. The UE of any of clauses 10-14, wherein the indication of the SL positioning session identifier comprises a time indicator of when the SL positioning session was initiated.

Clause 16. The UE of any of clauses 10-15, wherein the indication of the SL positioning session identifier comprises an indicator of a carrier frequency in which the SL positioning session was initiated.

Clause 17. The UE of any of clauses 10-16, wherein the message further comprises a number of UEs participating in the SL positioning session.

Clause 18. The UE of any of clauses 10-17, wherein the at least one processor is further configured to: receive a second message associated with a second SL PRS, the second message comprising identification of a second UE as a source of transmission of the second SL PRS and the indication of the SL positioning session identifier; receive the second SL PRS associated with the message; generate a measurement for the second SL PRS; and transmit an indication of the measurement for the second SL PRS.

Clause 19. A user equipment (UE) configured for supporting sidelink (SL) positioning, comprising: means for transmitting in a message associated with a SL positioning reference signal (PRS), the message comprising identification of the UE as a source of transmission of the SL PRS and an indication of a SL positioning session identifier; and means for transmitting the SL PRS associated with the message.

Clause 20. A non-transitory storage medium including program code stored thereon, the program code is operable to configure at least one processor in a user equipment (UE) for supporting sidelink (SL) positioning, the program code comprising instructions to: transmit in a message associated with a SL positioning reference signal (PRS), the message comprising identification of the UE as a source of transmission of the SL PRS and an indication of a SL positioning session identifier; and transmit the SL PRS associated with the message.

Clause 21. A method for supporting sidelink (SL) positioning performed by a user equipment (UE), comprising: obtaining SL positioning session information comprising an indication of a SL positioning session identifier; generating SL positioning reference signal (PRS) based on the indication of the SL positioning session identifier and identification of the UE; and transmitting the SL PRS.

Clause 22. The method of clause 21, wherein the indication of the SL positioning session identifier comprises an identifier associated with the SL positioning session.

Clause 23. The method of any of clauses 21-22, wherein the indication of the SL positioning session identifier comprises an expected PRS transmission time for a second UE that initiated the SL positioning session.

Clause 24. The method of any of clauses 21-23, wherein the indication of the SL positioning session identifier comprises a time indicator of when the SL positioning session was initiated.

Clause 25. The method of any of clauses 21-24, wherein the indication of the SL positioning session identifier comprises an indicator of a carrier frequency in which the SL positioning session was initiated.

Clause 26. The method of any of clauses 21-25, wherein generating the SL PRS based on the indication of the SL positioning session identifier and the identification of the UE comprises initializing or seeding generation of a SL PRS sequence based on the indication of the SL positioning session identifier and the identification of the UE.

Clause 27. The method of any of clauses 21-26, wherein generating the SL PRS based on the indication of the SL positioning session identifier and the identification of the UE comprises scrambling a SL PRS sequence based on the indication of the SL positioning session identifier and the identification of the UE.

Clause 28. The method of any of clauses 21-27, wherein generating the SL PRS based on the indication of the SL positioning session identifier and the identification of the UE comprises applying a cover code to a SL PRS sequence, wherein the cover code is based on the indication of the SL positioning session identifier and the identification of the UE.

Clause 29. The method of any of clauses 21-28, further comprising: receiving a second SL PRS from a second UE, the second SL PRS generated based on the indication of the SL positioning session identifier and identification of the second UE; determining the SL positioning session from the second SL PRS; generating a measurement for the second SL PRS; and transmitting an indication of the measurement for the second SL PRS.

Clause 30. A user equipment (UE) configured for supporting sidelink (SL) positioning, comprising: a wireless transceiver configured to wirelessly communicate with network entities; at least one memory; and at least one processor coupled to the wireless transceiver and the at least one memory, the at least one processor configured to: obtain SL positioning session information comprising an indication of a SL positioning session identifier; generate SL positioning reference signal (PRS) based on the indication of the SL positioning session identifier and identification of the UE; and transmit the SL PRS.

Clause 31. The UE of clause 30, wherein the indication of the SL positioning session identifier comprises an identifier associated with the SL positioning session.

Clause 32. The UE of any of clauses 30-31, wherein the indication of the SL positioning session identifier comprises an expected PRS transmission time for a second UE that initiated the SL positioning session.

Clause 33. The UE of any of clauses 30-32, wherein the indication of the SL positioning session identifier comprises a time indicator of when the SL positioning session was initiated.

Clause 34. The UE of any of clauses 30-33, wherein the indication of the SL positioning session identifier comprises an indicator of a carrier frequency in which the SL positioning session was initiated.

Clause 35. The UE of any of clauses 30-34, wherein the at least one processor is configured to generate the SL PRS based on the indication of the SL positioning session identifier and the identification of the UE by being configured to initialize or seed generation of a SL PRS sequence based on the indication of the SL positioning session identifier and the identification of the UE.

Clause 36. The UE of any of clauses 30-35, wherein the at least one processor is configured to generate the SL PRS based on the indication of the SL positioning session identifier and the identification of the UE by being configured to scramble a SL PRS sequence based on the indication of the SL positioning session identifier and the identification of the UE.

Clause 37. The UE of any of clauses 30-36, wherein the at least one processor is configured to generate the SL PRS based on the indication of the SL positioning session identifier and the identification of the UE by being configured to apply a cover code to a SL PRS sequence, wherein the cover code is based on the indication of the SL positioning session identifier and the identification of the UE.

Clause 38. The UE of any of clauses 30-37, wherein the at least one processor is further configured to: receive a second SL PRS from a second UE, the second SL PRS generated based on the indication of the SL positioning session identifier and identification of the second UE; determine the SL positioning session from the second SL PRS; generate a measurement for the second SL PRS; and transmit an indication of the measurement for the second SL PRS.

Clause 39. A user equipment (UE) configured for supporting sidelink (SL) positioning, comprising: means for obtaining SL positioning session information comprising an indication of a SL positioning session identifier; means for generating SL positioning reference signal (PRS) based on the indication of the SL positioning session identifier and identification of the UE; and means for transmitting the SL PRS.

Clause 40. A non-transitory storage medium including program code stored thereon, the program code is operable to configure at least one processor in a user equipment (UE) for supporting sidelink (SL) positioning, the program code comprising instructions to: obtain SL positioning session information comprising an indication of a SL positioning session identifier; generate SL positioning reference signal (PRS) based on the indication of the SL positioning session identifier and identification of the UE; and transmit the SL PRS.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the disclosure as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting sidelink (SL) positioning performed by a user equipment (UE), comprising:
    transmitting, from the UE, a message associated with a SL positioning reference signal (PRS), the message comprising identification of the UE as a source of transmission of the SL PRS and an indication of a SL positioning session identifier; and
    transmitting, from the UE, the SL PRS associated with the message.

2. The method of claim 1, wherein the message is transmitted using Layer 1 (L1) or Layer 2 (L2) control signaling or higher layer signaling.

3. The method of claim 2, wherein the L1 or L2 control signaling comprises a Sidelink Control Information (SCI) second stage message or a Medium Access Control-Control Element (MAC-CE) message.

4. The method of claim 1, wherein the indication of the SL positioning session identifier comprises an identifier associated with the SL positioning session.

5. The method of claim 1, wherein the indication of the SL positioning session identifier comprises an expected PRS transmission time for a second UE that initiated the SL positioning session.

6. The method of claim 1, wherein the indication of the SL positioning session identifier comprises a time indicator of when the SL positioning session was initiated.

7. The method of claim 1, wherein the indication of the SL positioning session identifier comprises an indicator of a carrier frequency in which the SL positioning session was initiated.

8. The method of claim 1, wherein the message further comprises a number of UEs participating in the SL positioning session.

9. The method of claim 1, further comprising:
    receiving a second message associated with a second SL PRS, the second message comprising identification of a second UE as a source of transmission of the second SL PRS and the indication of the SL positioning session identifier;
    receiving the second SL PRS associated with the message;
    generating a measurement for the second SL PRS; and
    transmitting an indication of the measurement for the second SL PRS.

10. A user equipment (UE) configured for supporting sidelink (SL) positioning, comprising:
    a wireless transceiver configured to wirelessly communicate with network entities;
    at least one memory; and
    at least one processor coupled to the wireless transceiver and the at least one memory, the at least one processor configured to:
    transmit, from the UE, a message associated with a SL positioning reference signal (PRS), the message comprising identification of the UE as a source of transmission of the SL PRS and an indication of a SL positioning session identifier; and
    transmit, from the UE, the SL PRS associated with the message.

11. The UE of claim 10, wherein the message is transmitted using Layer 1 (L1) or Layer 2 (L2) control signaling or higher layer signaling.

12. The UE of claim 11, wherein the L1 or L2 control signaling comprises a Sidelink Control Information (SCI) second stage message or a Medium Access Control—Control Element (MAC-CE) message.

13. The UE of claim 10, wherein the indication of the SL positioning session identifier comprises an identifier associated with the SL positioning session.

14. The UE of claim 10, wherein the indication of the SL positioning session identifier comprises an expected PRS transmission time for a second UE that initiated the SL positioning session.

15. The UE of claim 10, wherein the indication of the SL positioning session identifier comprises a time indicator of when the SL positioning session was initiated.

16. The UE of claim 10, wherein the indication of the SL positioning session identifier comprises an indicator of a carrier frequency in which the SL positioning session was initiated.

17. The UE of claim 10, wherein the message further comprises a number of UEs participating in the SL positioning session.

18. The UE of claim 10, wherein the at least one processor is further configured to:
    receive a second message associated with a second SL PRS, the second message comprising identification of a second UE as a source of transmission of the second SL PRS and the indication of the SL positioning session identifier;

receive the second SL PRS associated with the message;
generate a measurement for the second SL PRS; and
transmit an indication of the measurement for the second SL PRS.

19. A user equipment (UE) configured for supporting sidelink (SL) positioning, comprising:
   means for transmitting, from the UE, a message associated with a SL positioning reference signal (PRS), the message comprising identification of the UE as a source of transmission of the SL PRS and an indication of a SL positioning session identifier; and
   means for transmitting, from the UE, the SL PRS associated with the message.

20. A non-transitory storage medium including program code stored thereon, the program code is operable to configure at least one processor in a user equipment (UE) for supporting sidelink (SL) positioning, the program code comprising instructions to:
   transmit, from the UE, a message associated with a SL positioning reference signal (PRS), the message comprising identification of the UE as a source of transmission of the SL PRS and an indication of a SL positioning session identifier; and
   transmit, from the UE, the SL PRS associated with the message.

21. A method for supporting sidelink (SL) positioning performed by a user equipment (UE), comprising:
   obtaining SL positioning session information comprising an indication of a SL positioning session identifier;
   generating, at the UE, SL positioning reference signal (PRS) based on the indication of the SL positioning session identifier and identification of the UE; and
   transmitting, from the UE, the SL PRS.

22. The method of claim 21, wherein the indication of the SL positioning session identifier comprises an identifier associated with the SL positioning session.

23. The method of claim 21, wherein the indication of the SL positioning session identifier comprises an expected PRS transmission time for a second UE that initiated the SL positioning session.

24. The method of claim 21, wherein the indication of the SL positioning session identifier comprises a time indicator of when the SL positioning session was initiated.

25. The method of claim 21, wherein the indication of the SL positioning session identifier comprises an indicator of a carrier frequency in which the SL positioning session was initiated.

26. The method of claim 21, wherein generating the SL PRS based on the indication of the SL positioning session identifier and the identification of the UE comprises initializing or seeding generation of a SL PRS sequence based on the indication of the SL positioning session identifier and the identification of the UE.

27. The method of claim 21, wherein generating the SL PRS based on the indication of the SL positioning session identifier and the identification of the UE comprises scrambling a SL PRS sequence based on the indication of the SL positioning session identifier and the identification of the UE.

28. The method of claim 21, wherein generating the SL PRS based on the indication of the SL positioning session identifier and the identification of the UE comprises applying a cover code to a SL PRS sequence, wherein the cover code is based on the indication of the SL positioning session identifier and the identification of the UE.

29. The method of claim 21, further comprising:
   receiving a second SL PRS from a second UE, the second SL PRS generated based on the indication of the SL positioning session identifier and identification of the second UE;
   determining the SL positioning session from the second SL PRS;
   generating a measurement for the second SL PRS; and
   transmitting an indication of the measurement for the second SL PRS.

30. A user equipment (UE) configured for supporting sidelink (SL) positioning, comprising:
   a wireless transceiver configured to wirelessly communicate with network entities;
   at least one memory; and
   at least one processor coupled to the wireless transceiver and the at least one memory, the at least one processor configured to:
      obtain SL positioning session information comprising an indication of a SL positioning session identifier;
      generate, at the UE, SL positioning reference signal (PRS) based on the indication of the SL positioning session identifier and identification of the UE; and
      transmit, from the UE, the SL PRS.

31. The UE of claim 30, wherein the indication of the SL positioning session identifier comprises an identifier associated with the SL positioning session.

32. The UE of claim 30, wherein the indication of the SL positioning session identifier comprises an expected PRS transmission time for a second UE that initiated the SL positioning session.

33. The UE of claim 30, wherein the indication of the SL positioning session identifier comprises a time indicator of when the SL positioning session was initiated.

34. The UE of claim 30, wherein the indication of the SL positioning session identifier comprises an indicator of a carrier frequency in which the SL positioning session was initiated.

35. The UE of claim 30, wherein the at least one processor is configured to generate the SL PRS based on the indication of the SL positioning session identifier and the identification of the UE by being configured to initialize or seed generation of a SL PRS sequence based on the indication of the SL positioning session identifier and the identification of the UE.

36. The UE of claim 30, wherein the at least one processor is configured to generate the SL PRS based on the indication of the SL positioning session identifier and the identification of the UE by being configured to scramble a SL PRS sequence based on the indication of the SL positioning session identifier and the identification of the UE.

37. The UE of claim 30, wherein the at least one processor is configured to generate the SL PRS based on the indication of the SL positioning session identifier and the identification of the UE by being configured to apply a cover code to a SL PRS sequence, wherein the cover code is based on the indication of the SL positioning session identifier and the identification of the UE.

38. The UE of claim 30, wherein the at least one processor is further configured to:
   receive a second SL PRS from a second UE, the second SL PRS generated based on the indication of the SL positioning session identifier and identification of the second UE;

determine the SL positioning session from the second SL PRS;

generate a measurement for the second SL PRS; and transmit an indication of the measurement for the second SL PRS.

39. A user equipment (UE) configured for supporting sidelink (SL) positioning, comprising:

means for obtaining SL positioning session information comprising an indication of a SL positioning session identifier;

means for generating, at the UE, SL positioning reference signal (PRS) based on the indication of the SL positioning session identifier and identification of the UE; and means for transmitting, from the UE, the SL PRS.

40. A non-transitory storage medium including program code stored thereon, the program code is operable to configure at least one processor in a user equipment (UE) for supporting sidelink (SL) positioning, the program code comprising instructions to:

obtain SL positioning session information comprising an indication of a SL positioning session identifier;

generate, at the UE, SL positioning reference signal (PRS) based on the indication of the SL positioning session identifier and identification of the UE; and transmit, from the UE, the SL PRS.

* * * * *